(12) United States Patent
Shah et al.

(10) Patent No.: US 8,695,076 B2
(45) Date of Patent: Apr. 8, 2014

(54) REMOTE REGISTRATION FOR ENTERPRISE APPLICATIONS

(75) Inventors: Harshal Shah, Fremont, CA (US); Jui Deshpande, Mountain View, CA (US)

(73) Assignee: Oracle International Corporation, Redwood Shores, CA (US)

(*) Notice: Subject to any disclaimer, the term of this patent is extended or adjusted under 35 U.S.C. 154(b) by 301 days.

(21) Appl. No.: 12/827,298

(22) Filed: Jun. 30, 2010

(65) Prior Publication Data
US 2011/0231918 A1 Sep. 22, 2011

Related U.S. Application Data

(60) Provisional application No. 61/315,633, filed on Mar. 19, 2010.

(51) Int. Cl.
*G06F 7/04* (2006.01)

(52) U.S. Cl.
USPC .............................................................. 726/8

(58) Field of Classification Search
USPC .............................................................. 726/8
See application file for complete search history.

(56) References Cited

U.S. PATENT DOCUMENTS

| | | | |
|---|---|---|---|
| 7,143,190 B2 | 11/2006 | Christensen et al. | |
| 7,392,536 B2 | 6/2008 | Jamieson et al. | |
| 7,409,543 B1 | 8/2008 | Bjorn | |
| 7,415,607 B2* | 8/2008 | Sinn | 713/158 |
| 7,475,146 B2 | 1/2009 | Bazot et al. | |
| 7,540,020 B1* | 5/2009 | Biswas et al. | 726/6 |
| 7,540,022 B2 | 5/2009 | Barari et al. | |
| 7,596,953 B2 | 10/2009 | Krok et al. | |
| 8,321,566 B2 | 11/2012 | Schroeder, Jr. et al. | |
| 8,336,089 B1* | 12/2012 | Ahmed et al. | 726/7 |
| 8,346,929 B1* | 1/2013 | Lai | 709/226 |
| 2001/0013096 A1 | 8/2001 | Luckenbaugh et al. | |
| 2001/0039570 A1* | 11/2001 | Stewart et al. | 709/205 |
| 2002/0010651 A1* | 1/2002 | Cohn et al. | 705/26 |
| 2002/0169842 A1 | 11/2002 | Christensen et al. | |
| 2002/0188513 A1* | 12/2002 | Gil et al. | 705/22 |
| 2003/0163733 A1* | 8/2003 | Barriga-Caceres et al. | 713/201 |
| 2005/0039008 A1* | 2/2005 | Bhatia et al. | 713/170 |
| 2006/0075224 A1 | 4/2006 | Tao | |
| 2006/0080352 A1* | 4/2006 | Boubez et al. | 707/102 |
| 2006/0136990 A1* | 6/2006 | Hinton et al. | 726/2 |
| 2007/0038780 A1 | 2/2007 | Christensen et al. | |
| 2008/0301057 A1 | 12/2008 | Oren | |
| 2009/0031125 A1 | 1/2009 | Bjorn | |
| 2009/0126000 A1 | 5/2009 | Andreev et al. | |
| 2009/0327094 A1 | 12/2009 | Elien et al. | |
| 2009/0328207 A1 | 12/2009 | Patel | |
| 2011/0107089 A1* | 5/2011 | Koottayi et al. | 713/156 |
| 2012/0144457 A1 | 6/2012 | Counterman | |

OTHER PUBLICATIONS

Vinaye Misra, Oracle Application Server Single Sign-on Adminstrator's Guide, Jul. 2005, 10gRElease 2(10.1.2), pp. 1-212.*

(Continued)

*Primary Examiner* — Tehane Gergiso
(74) *Attorney, Agent, or Firm* — Miles & Stockbridge P.C.

(57) ABSTRACT

A partner registration module can provide for an automatic registration of partners to a central server. An entire partner registration process can be automated from end to end, providing a unified process for registering partners. The partner registration module can be fully compatible with current registration agents and next generation registration agents.

21 Claims, 20 Drawing Sheets

(56) References Cited

OTHER PUBLICATIONS

Nina et al., Oracle Access Manager Integration Guide, Aug. 2007, 10g(10.1.4.2), pp. 1-490.*
Harshal Shah, et al., U.S. Appl. No. 12/827,399, filed Jun. 30, 2010.
Oracle, "Oracle Enterprise Single Sign-on Technical Guide; An Oracle White Paper", Jun. 2009, pp. 1-10, http://www.oracle.com/products/middleware/identity-management/docs/esso-whitepaper.pdf.
Oracle, "Oracle Access Manager; An Oracle White Paper", pp. 1-16, http://www.oracle.com/technology/products/id_mgmt/coreid_acc/pdf/access_manager_wp_10gr3.pdf, Aug. 2007.

* cited by examiner

REMOTE REGISTRATION FOR ENTERPRISE APPLICATIONS

CROSS-REFERENCE TO RELATED APPLICATIONS

This application claims priority of U.S. Provisional Patent Application Ser. No. 61/315,633, filed on Mar. 19, 2010. The subject matter of the earlier filed application is hereby incorporated by reference.

FIELD

One embodiment is directed generally to a computer system, and in particular to access management computer systems.

BACKGROUND

Single sign-on ("SSO") is a property of managing access of multiple computer systems that are independent, but also related. Under SSO, once a user securely signs-on to a central server, such as a SSO server, a user gains access to all computer systems (identified as "partner applications" or "partners" or "agents") that have delegated their authentication functions to the server. This means that the user does not have to securely sign-on to each partner.

For example, if a user tries to access a partner that has delegated its authentication function to a SSO server, the user is redirected to the SSO server, where the SSO server challenges the use for credentials, such as a user name and password. After verifying the user's credentials, the SSO server sets a session cookie and passes an authentication token to the partner. The partner then serves up the requested content. If a user tries to access a second partner that has also delegated its authentication function to the SSO server, the user is again redirected to the SSO server. However, this time, the SSO server does not challenge the user for credentials a second time. Instead, the SSO server uses the session cookie to validate the user identity. Upon validating the identity of the user, the SSO server passes an authentication token to the second partner, and the second partner serves up the requested content. Thus, the user only needs to sign on to the SSO server one time.

In order to implement SSO, each partner that wishes to delegate its authentication functions is required to have previously registered with a central server, such as a SSO server. Each partner is required to register with the central server, among other reasons, so that the central server can properly receive redirected requests, and can properly send authentication tokens back to each partner. Partner registration processes are discussed below in greater detail.

SUMMARY

One embodiment of the invention is directed to a computer-readable medium having instructions stored thereon that, when executed by a processor, cause the processor to perform a method. The instructions include creating a request object and transmitting the request object to an access server, where the request object includes information of a partner application, and provisioning the partner application in the access server based on the request object. The instructions further include generating a response object based on the provisioning of the partner application, and transmitting the response object to a web server. The instructions further include applying the response object to deploy the partner application at the web server.

Another embodiment of the invention is directed to a computer-readable medium having instructions stored thereon that, when executed by a processor, cause the processor to perform a method. The instructions include delegating provisioning rights to a web server, and transmitting an external event, using information of a partner application, to an access server, where the external events calls a procedure that provisions the partner application. The instructions further include generating a response object based on the provisioning of the partner application, and transmitting the response object to the web server. The instructions further include applying the response object to deploy the partner application at the web server.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
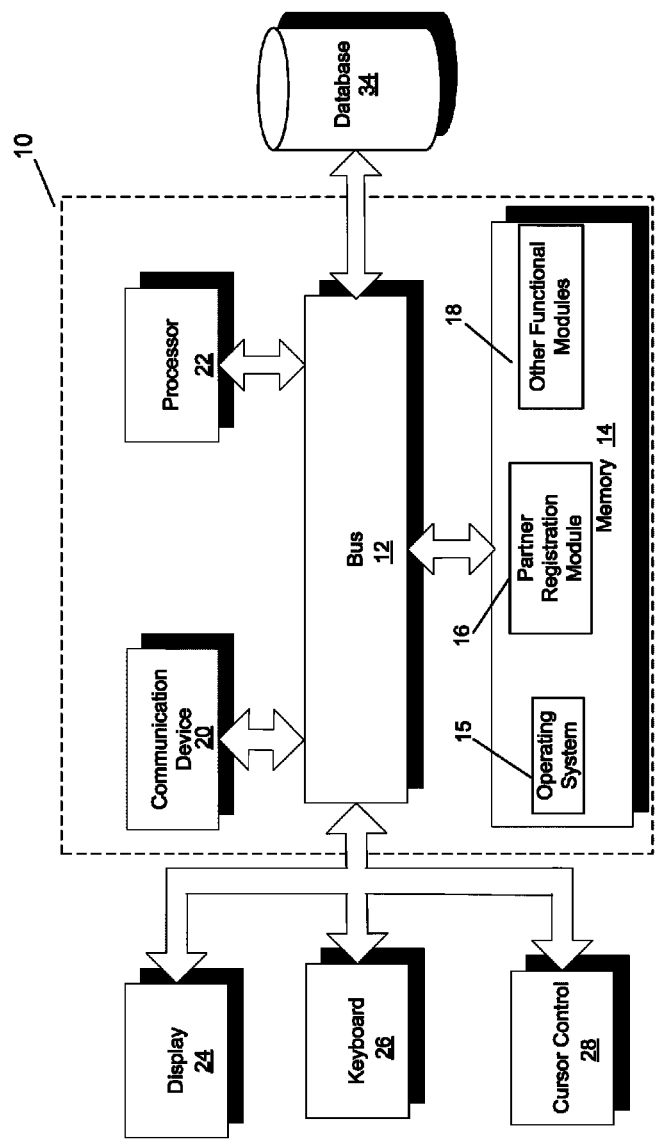
FIG. 1 illustrates a block diagram of a system that may implement an embodiment of the invention.

According to one embodiment of the invention, a partner registration module can provide for an automatic registration of partners to a central server. According to the embodiment, the entire partner registration process can be automated from end to end, providing a unified process for registering partners. According to the embodiment of the invention, the partner registration module can be fully compatible with current registration agents and next generation registration agents.

As previously described, in order to implement SSO, each partner that wishes to participate in SSO, and delegate its authentication functions to a central server, must first register with the central server. There can be many different partner registration processes, depending on how SSO is implemented.

One example of a partner registration process is an Oracle AS Single Sign-On ("OSSO") partner registration process from Oracle Corp. In the OSSO partner registration process, an OSSO partner (also identified as an "OSSO agent") registers with a SSO server. An administrator of the partner runs a script on the partner's Oracle Hypertext Transfer Protocol ("HTTP") server (also identified as a web server) in order to register the partner with an SSO server. The script is run within an Oracle HTTP Server module that provides OracleAS applications with authentication, known as a mod_osso module. The mod_osso module enables partners to accept authenticated user information instead of a user name and password once a user has logged in to the SSO server. If the Oracle HTTP server is run on a UNIX platform, the script is an ssoreg.sh script. If the Oracle HTTP server is run on a Windows platform, the script is an ssoreg.bat batch file. The script causes the SSO server to look up the partner's information in an Oracle Internet Directory, connect to an Oracle Database, register the partner, and generate an osso.conf file. The osso.conf file is used to deploy and initiate the applications necessary for the partner to communicate with the SSO server. The SSO server then transmits the osso.conf file to the administrator of the partner. The administrator of the partner than places the osso.conf file in the appropriate directory, and runs the osso.conf file to deploy and initiate the applications necessary for the partner to communicate with the SSO Server.

Another example of a partner registration process is an Oracle Access Manager (OAM) partner registration process from Oracle Corp. An OAM partner registration process involves a policy manager, an access gate and an access server. A policy manager provides a login interface to an access system, and allows administrators to define resources to be protected, and to group resources into policy domains. A policy domain comprises resource types to protect, rules for protection, policies for protection, and administrative rights. The policy manager has a component identified as an access system console. The access system console permits administrators to add, change, and remove access clients and access servers, configure authentication and authorization schemes, configure master audit settings, and configure host identities.

An access gate (also identified as an "OAM agent") is a custom web gate that processes resource requests from user applications by intercepting the resource requests and forwarding them to an access server for authentication and authorization. A web gate is an out-of-the-box access client for HTTP resources.

An access server is a standalone server (or a collection of servers) that provide authentication, authorization, and auditing ("AAA") services. The access server validates credentials, authorizes users, and manages user sessions. The access server receives requests from an access client and queries authentication, authorization, and auditing rules in a directory server.

The OAM partner registration process requires at least one access server to be installed. An access server instance in an access system console is first created. Next, a transport security level for installation is selected. The three transport security levels for installation are open, simple, and cert. In an open transport security level, an access gate and the access server communicate over an open protocol with no security. In a simple transport security level, a password is shared between an access gate and the access server for security, where an access gate must provide a password in order to communicate with the access server. A certificate is then generated from the password. In a cert transport security level, an access gate provides a pre-generated certificate from a third-party to the access server in order to communicate with the access server. Once a transport security level is selected, the access server is installed and configured with configuration parameters.

Once at least one access server is installed, an access gate can be installed on a web server and configured. An access gate instance in an access system console is first created. The access gate instance is then associated with the access server. Next, the same transport security level for installation (i.e., open, simple, or cert) as the access server is selected. The access gate is then installed, which results in the access gate generating an ObAccessClient.xml file. The ObAccessClient.xml file contains the configuration parameters for the access gate. The web server is then restarted, and the access gate initiates a handshake with the access server, which establishes a communication protocol between the two entities, based on the transport security level selected by both entities.

As illustrated in the preceding partner registration examples, a partner registration process generally includes a series of manual steps for each partner that registers with a central server. Because the steps are manual, the possibility exists for steps to be implemented inconsistently for each partner. For example, if a database connection failed during a partner registration process, a partner may only be partially registered with the central server. Because the steps for a partner registration process are manual, there is no way to compensate for a failed partner registration process without retracing all the manual steps. When many partners have been registered, retracing the manual steps for each partner can be time-consuming and labor-intensive. Thus, according to an embodiment of the invention, a new partner registration process is described that can support existing partner registration agents, and can be extendible so that it can support any future partner registration agents.

FIG. 1 illustrates a block diagram of a system 10 that may implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a partner registration module 16, as well as other functional modules 18. Operating system 15 can provide an operating system functionality for system 10. Partner registration module 16 can provide functionality for registering a partner, as will be described in more detail below. System 10 can also be part of a larger system. Thus, system 10 can include one or more additional functional modules 18 to include the additional functionality. For example, functional modules 18 may include modules that are part of the "Oracle Access Manager" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

FIGS. 2-20 illustrate different features of the partner registration process according to different embodiments of the invention. FIGS. 2-6 and 19-20 illustrate respective overviews of the partner registration process according to different embodiments of the invention. FIGS. 7-18 illustrate more detailed embodiments of the partner registration process.

Partner Registration Process Overview

Figure 2:
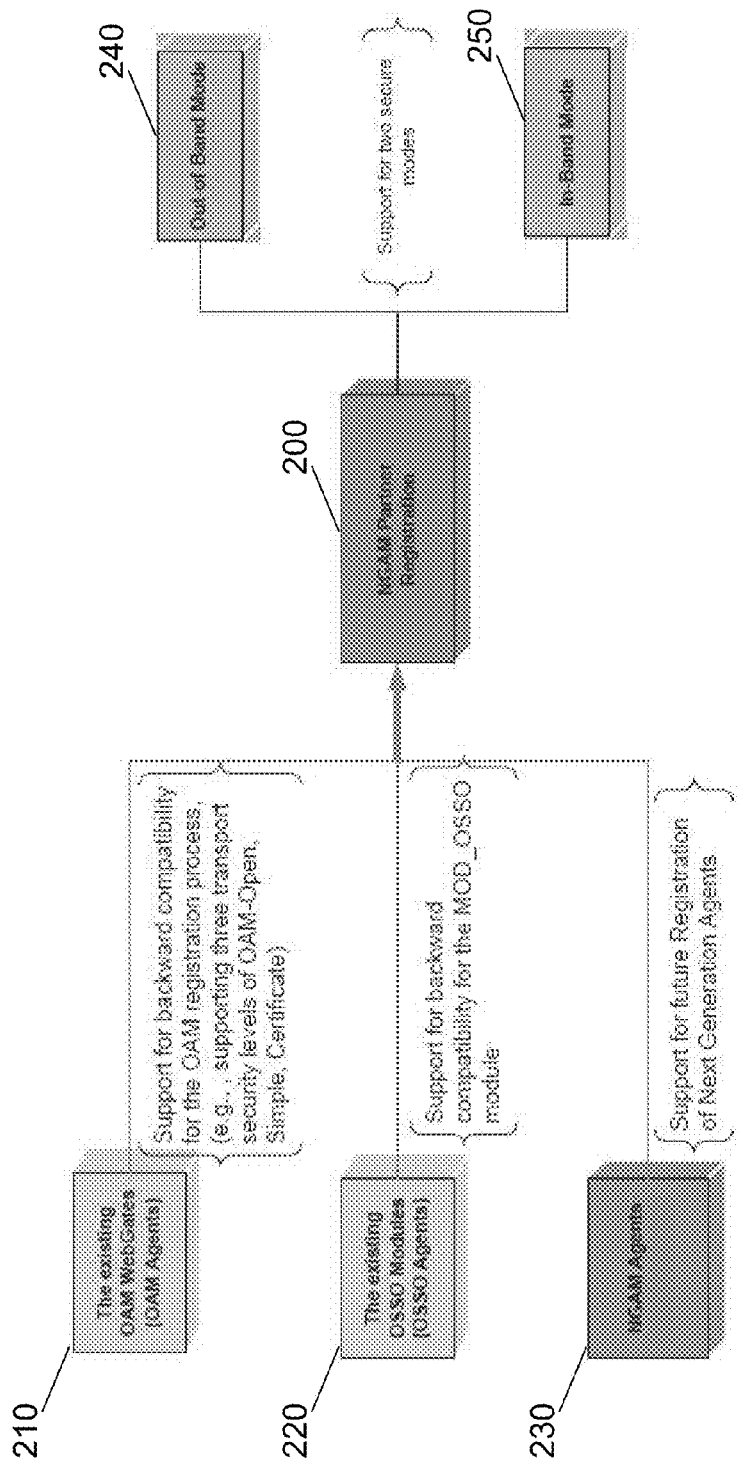
FIG. 2 illustrates an overview of a partner registration module according to an embodiment of the invention.

FIG. 2 illustrates an overview of a partner registration module according to an embodiment of the invention. The illustrated embodiment includes a partner registration module (identified in FIG. 2 as functional block next generation access management (NGAM) partner registration 200) configured to perform a partner registration process.

According to the embodiment, the partner registration module can include three features. The first feature is that the partner registration module can support existing registration agents, such as OAM agents and OSSO agents (identified in FIG. 2 as functional blocks OAM agents 210 and OSSO agents 220). According to the embodiment, the partner registration module can generate an artifact, such as a configuration file, that each existing registration agent uses to register a partner. For example, the partner registration module can generate an OAM configuration file, such as an ObAccessClient.xml file, for an OAM agent. As another example, the partner registration module can generate an OSSO configuration file, such as an osso.conf file for an OSSO agent.

The second feature is that the partner registration module can be extendible so that it can support any future partner registration agents (identified in FIG. 2 as functional block NGAM agents 230). This means that the partner registration module can be configured to produce any necessary artifacts required by partner registration agents that are developed in the future.

The third feature is that the partner registration module can support partner registration processes under two secure modes, out-of-band mode and in-band mode (identified in FIG. 2 as functional blocks out-of-band mode 240 and in-band mode 250. In out-of-band mode, a security administrator does not delegate access rights to the partner administrator, and the partner administrator must send a request file to the security administrator, requesting to register the partner. The security administrator subsequently registers the partner and sends a response object back to the partner administrator. In an in-band mode, a security administrator delegates access rights to a partner administrator, and allows the partner administrator to run an automated remote registration tool which generates an external event in order to register the partner.

Figure 3:
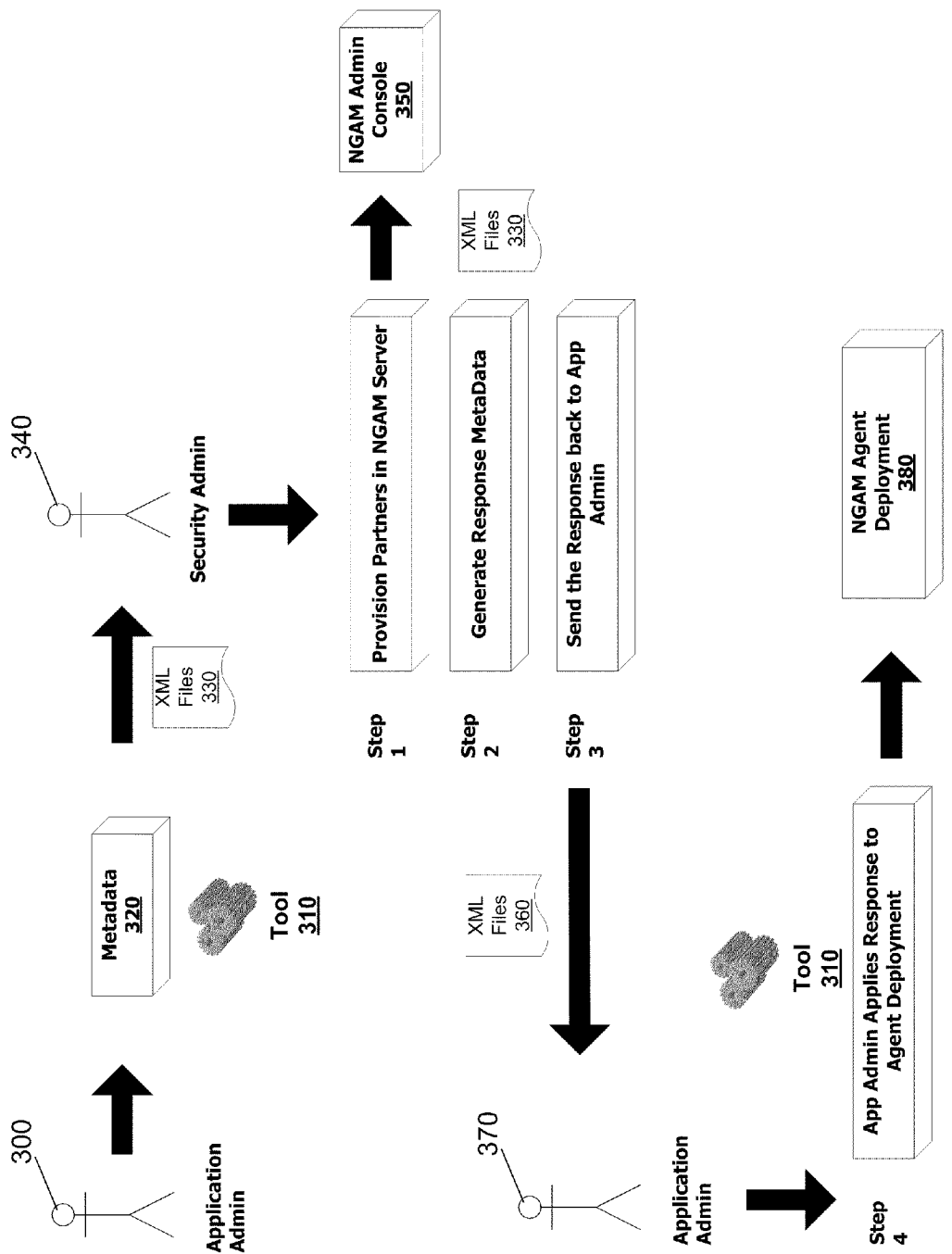
FIG. 3 illustrates an overview of a partner registration process in an out-of-band mode according to an embodiment of the invention.

FIG. 3 illustrates an overview of a partner registration process in an out-of-band mode according to an embodiment of the invention. As previously discussed, an out-of-band mode is a mode in which a partner registration process can take place according to an embodiment of the invention. According to the embodiment, an administrator of a partner application (identified in FIG. 3 as application admin 300) uses a partner registration tool (identified in FIG. 3 as tool 310) to create metadata 320 that includes information of the partner application. The metadata can include a subset of elements based on a partner registration process, such as an OSSO partner registration process, or an OAM partner registration process. As previously discussed, a partner application is also identified as an agent, so application admin 300 is also identified as an agent. Application admin 300 stores metadata 320 in a request object, such as one or more Extensible Markup Language ("XML") files (identified in FIG. 3 as XML files 330). Application admin 300 transmits XML files 330 to a security administrator (identified in FIG. 3 as security admin 340).

At step 1, according to the embodiment, security admin 340 provisions the partner in an NGAM server. The provisioning of the partner includes transmitting XML files 330 to a user interface tool (identified in FIG. 3 as NGAM admin console 350). At step 2, security admin 340 receives a response from NGAM admin console 350 and generates response metadata. The response can be specific to the type of partner being registered. Security admin 340 stores the response metadata in a response object, such as one or more XML files (identified in FIG. 3 as XML files 360). At step 3, security admin 340 transmits XML files 360 to application admin 300 to enable application admin 300 to complete the configuration of an agent. At step 4, application admin 300 applies the response object using tool 310 to deploy the agent. The application of the response object can include creating an artifact, where the artifact can bootstrap the agent. The successful deployment of the agent is identified in FIG. 3 as NGAM agent deployment 380.

According to the embodiment, backward compatibility is provided, and thus, the provisioning of current agents, such as OSSO and OAM agents, does not change. For example, application admin 300 receives an osso.conf file, when application admin 300 is an OSSO agent. Likewise, application admin 300 receives an ObAccessClient.xml file, when application admin 300 is an OAM agent.

Figure 4:
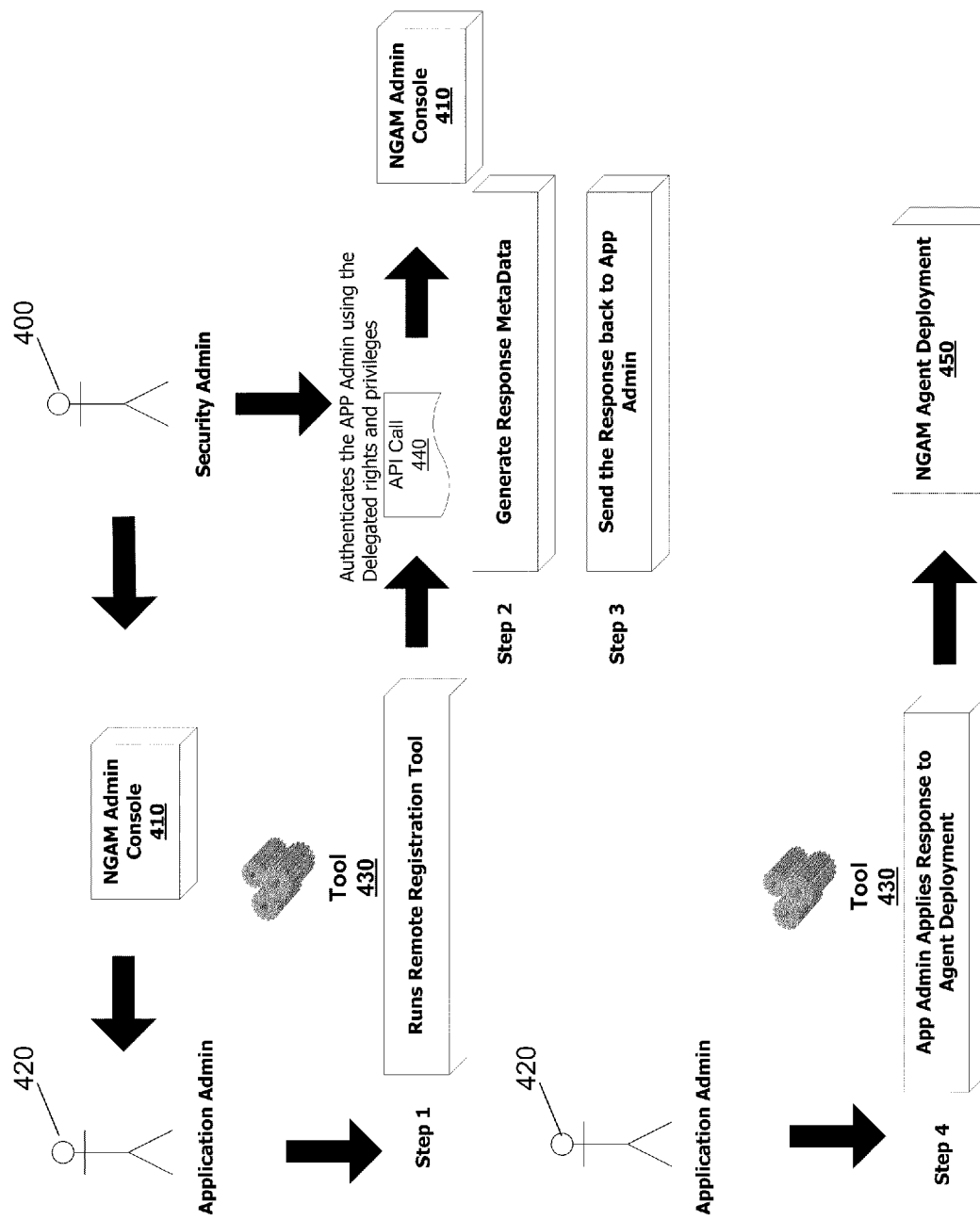
FIG. 4 illustrates an overview of a partner registration process in an in-band mode according to an embodiment of the invention.

FIG. 4 illustrates an overview of a partner registration process in an in-band mode according to an embodiment of the invention. As previously discussed, an in-band mode is a mode in which a partner registration process can take place according to an embodiment of the invention. According to the embodiment, a security administrator (identified in FIG. 4 as security admin 400) delegates its provisioning rights to an administrator of a partner application (identified in FIG. 4 as application admin 420) through a user interface tool (identified in FIG. 4 as NGAM Admin Console 410). Application Admin 420 can then use NGAM admin console 410 or a remote registration tool (identified in FIG. 4 as tool 430).

At step 1, application admin 420 runs tool 430. Tool 430 can contain parameters based on the type of agent that application admin 420 is. Tool 430 can then transmit an external event to an SSO controller (not shown) through an API call (identified in FIG. 4 as API call 440). At step 2, the partner application is registered, and response metadata is generated. The response metadata is then stored in a response object. At step 3, the response object is transmitted to application admin 420. The response object is in a specific format expected by the partner application. At step 4, application admin 420 applies the response object using tool 430 to deploy the agent. The application of the response object can include creating an artifact where the artifact can bootstrap the agent. The successful deployment of the agent is identified in FIG. 4 by NGAM agent deployment 450.

Figure 5:
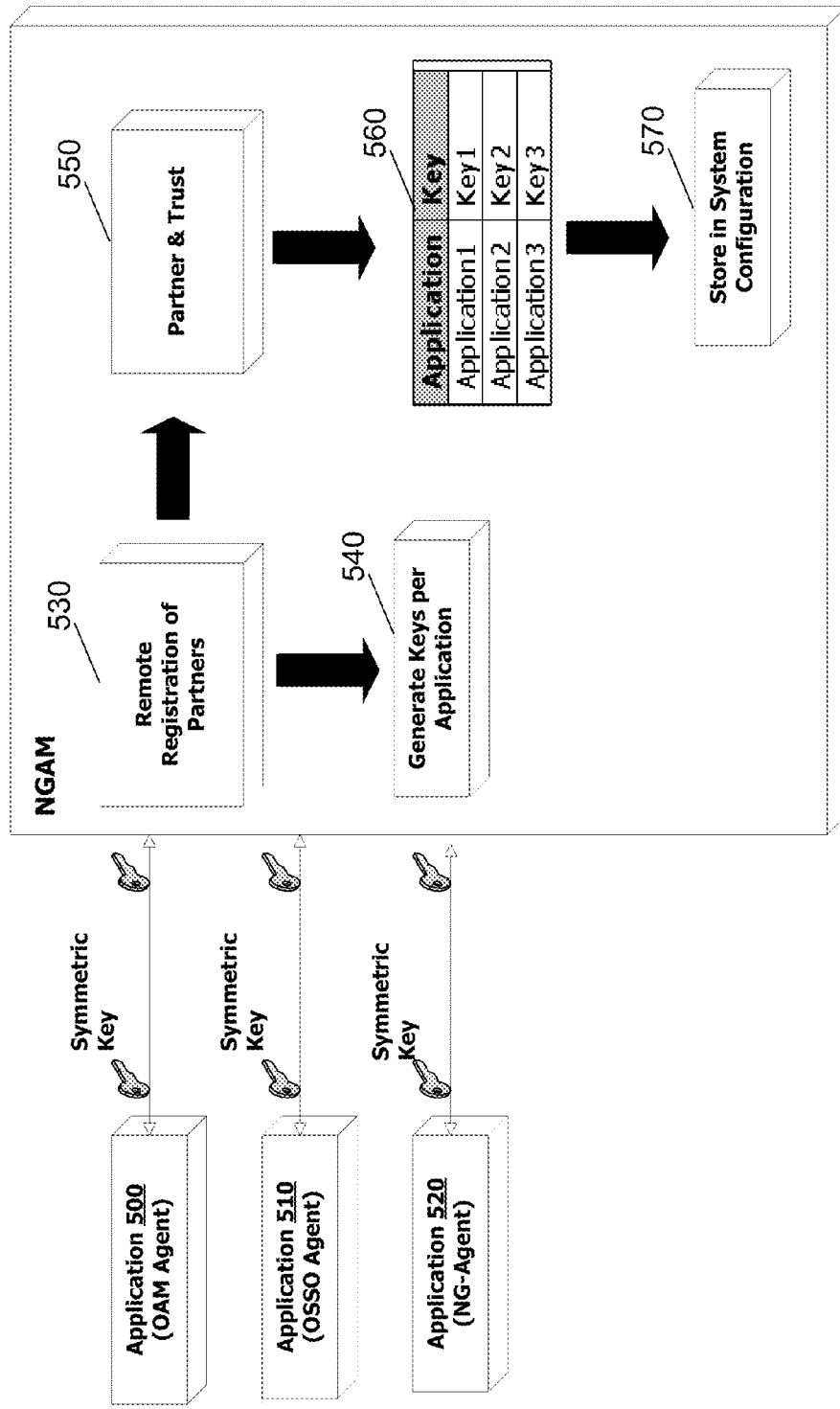
FIG. 5 illustrates an overview of a key generation process according to an embodiment of the invention.

FIG. 5 illustrates an overview of a key generation process according to an embodiment of the invention. The illustrated embodiment includes three partner applications, applications 500, 510, and 520. Application 500 is an OAM agent, application 510 is an OSSO agent, and application 520 is a next generation agent (identified in FIG. 5 as NG-Agent). Applications 500, 510, and 520 each have a symmetric key generated by remote registration of partners module 530. The generation of the symmetric key is identified in FIG. 5 as functional block generate keys per application 540. The illustrated embodiment also includes partner and trust module 550. Partner and trust module 550 maps an application, key, and type of agent in storage 560, and partner and trust module 550 persists storage 560 in system configuration 570. Partner and trust module 550 also provides application programming interfaces (APIs) for an SSO controller (not shown) or an authentication engine (also not shown) for retrieving the symmetric keys and agent configuration information.

Figure 6:
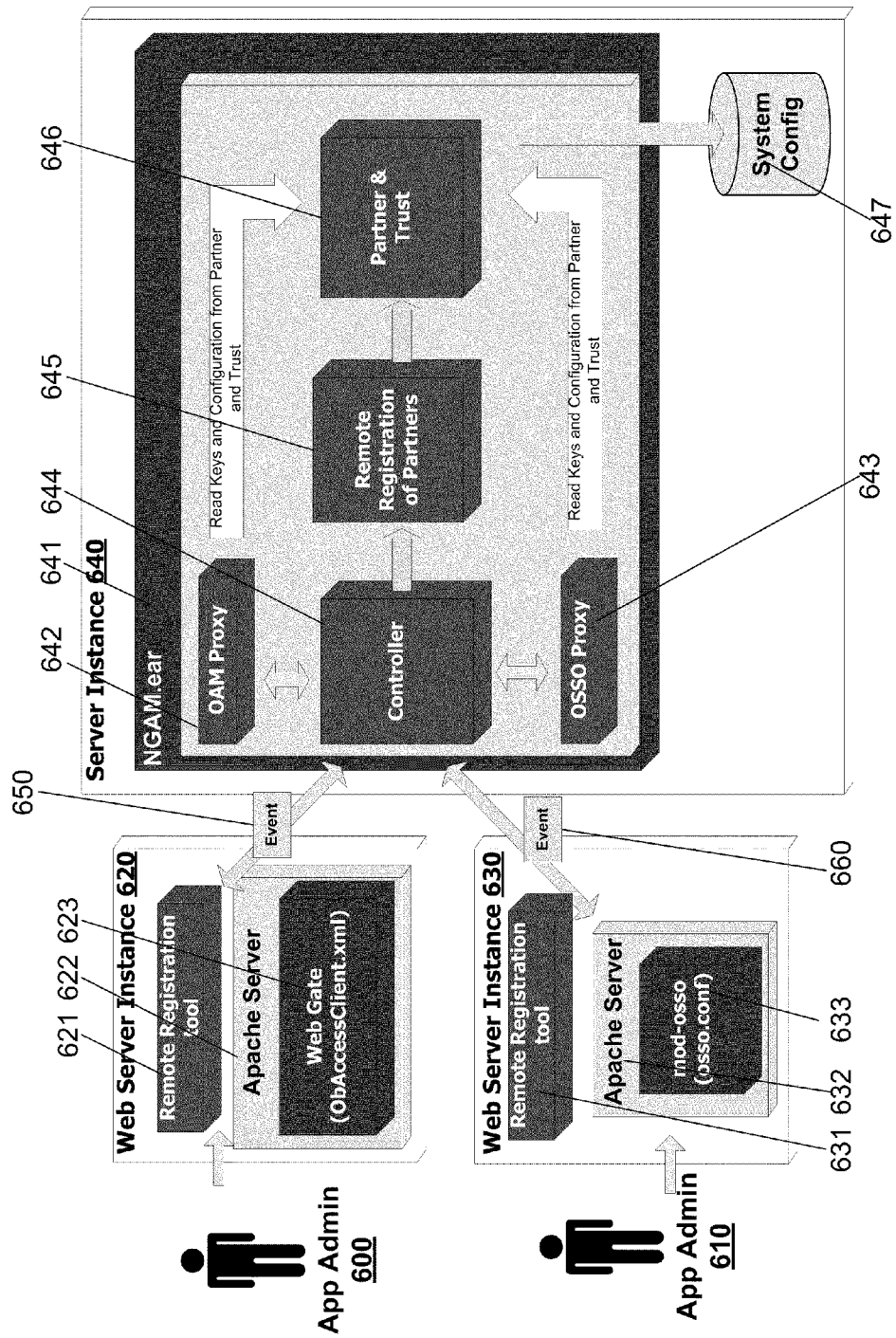
FIG. 6 illustrates an overview of an external event generation process according to an embodiment of the invention.

FIG. 6 illustrates an overview of an external event generation process according to an embodiment of the invention. The illustrated embodiment includes app admin 600, which is an administrator of the partner application residing on web server instance 620, and app admin 610, which is an administrator of the partner application residing on web server instance 630. Web server instance 620 includes remote registration tool 621, Apache server 622, and web gate 623, where web gate 623 includes an ObAccessClient.xml file. Web server instance 630 includes remote registration tool 631, Apache server 632, and mod_osso module 633, where mod_osso module 633 includes an osso.conf file.

The illustrated embodiment also includes server instance 640. In one embodiment of the invention, server instance 640 is a WebLogic Server ("WLS") instance. Server instance 640 includes NGAM.ear archive 641. As one of ordinary skill in the art would readily appreciate, an Enterprise Archive ("EAR") is a file format for packaging one or more modules in a single archive so that the deployment of the various modules onto an application server occur simultaneously. NGAM.ear archive 641 includes OAM proxy 642, OSSO proxy 643, controller 644, which is an SSO controller, remote registration of partners module 645, partner and trust module 646, and system configuration 647 (identified in FIG. 6 as System Config).

According to the illustrated embodiment of the invention, the remote registration of partners occurs through external events. In the illustrated embodiment, remote registration tool 621 triggers event 650, which is sent to controller 644 through a protocol binding layer. OAM proxy 642 directly invokes an API on partner and trust module 646 to lookup specific key and configuration information. After receiving a response, remote registration tool 621 generates an ObAccessClient.xml file and stores the file at web server instance 620.

Likewise, in the illustrated embodiment, remote registration tool 631 triggers event 660, which is sent to controller 644 though a protocol binding layer. OSSO proxy 643 directly invokes an API on partner and trust module 646 to lookup specific key and configuration information. After receiving a response, remote registration tool 631 generates an osso.conf file and stores the file at web server instance 630.

Partner Registration Tool

Figure 7:
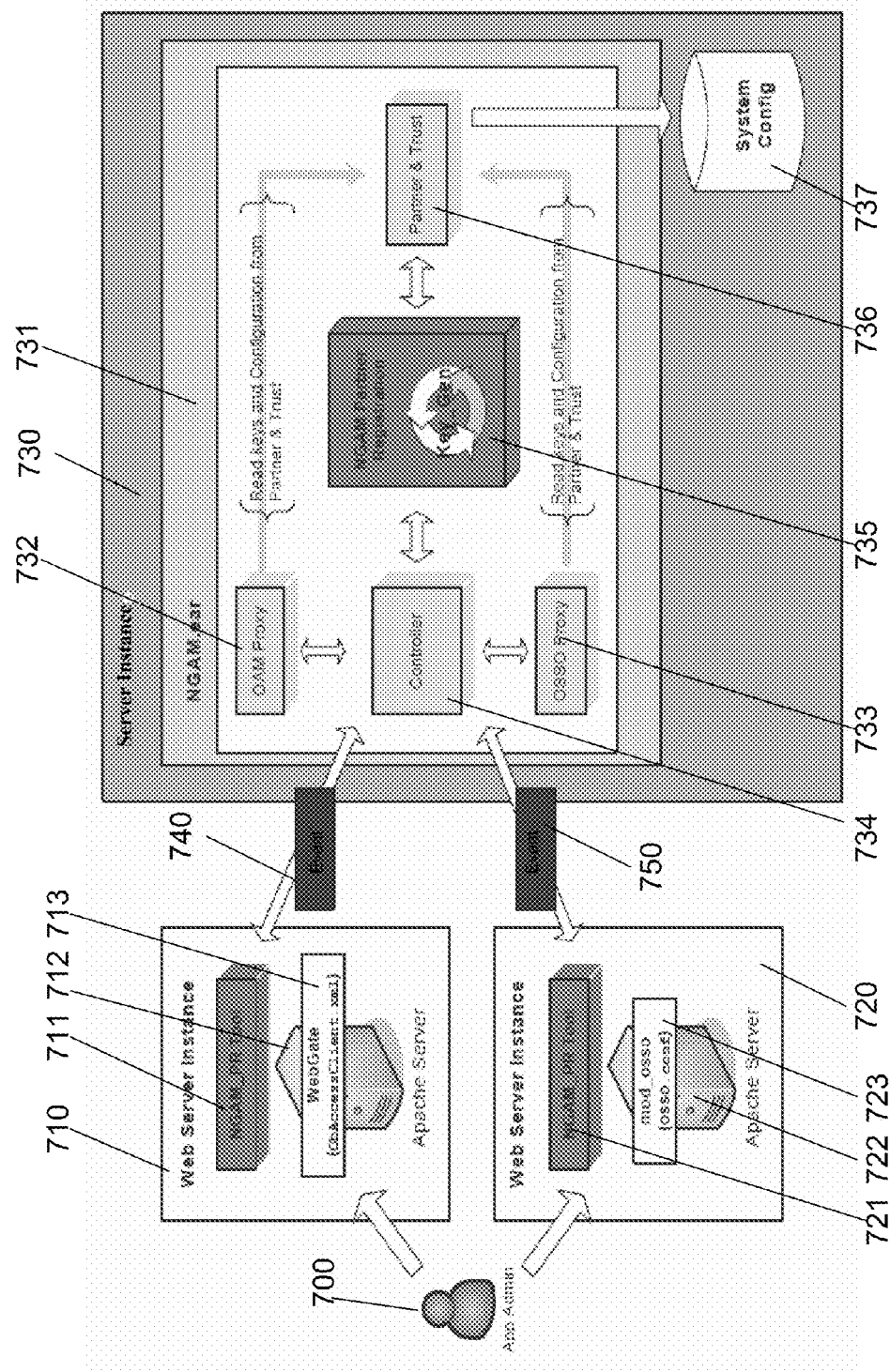
FIG. 7 illustrates a framework for a partner registration process according to an embodiment of the invention.

FIG. 7 illustrates a framework for a partner registration process according to an embodiment of the invention. The illustrated embodiment includes an administrator of a partner application (identified in FIG. 7 as app admin 700), web server instance 710, web server instance 720, and server instance 730. In one embodiment of the invention, server instance 730 is a WebLogic Server ("WLS") instance.

According to the embodiment, web server instance 710 includes partner registration module NGAM_PR Tool 711, Apache server 712, and web gate 713, where web gate 713 includes an ObAccessClient.xml file. Web server instance 720 includes partner registration module NGAM_PR Tool 721, Apache server 722, and mod_osso module 723, where mod_osso module 723 includes an osso.conf file. Server instance 730 includes NGAM.ear archive 731. As one of ordinary skill in the art would readily appreciate, an EAR is a file format for packaging one or more modules in a single archive so that the deployment of the various modules onto an application server occurs simultaneously. NGAM.ear archive 731 includes OAM proxy 732, OSSO proxy 733, Controller 734, which is an SSO controller, NGAM partner registration module 735, partner and trust module 736, and system configuration 737 (identified in FIG. 7 as System Config).

FIG. 7 is similar to FIG. 6, but is a more detailed illustration of the process illustrated in FIG. 6 with a focus on the partner registration modules that provide the functionality of partner registration (identified in FIG. 7 as NGAM_PR Tool 711 in web server instance 710, NGAM_PR Tool 721 in web server instance 720, and NGAM partner registration 735 in server instance 730). According to the embodiment of the invention, partner registration modules NGAM_PR Tool 711, NGAM_PR Tool 721, and NGAM partner registration 735 perform the partner registration operations. Specifically, partner registration modules NGAM_PR Tool 711 and NGAM_PR Tool 721 each create requests objects for the partner registration and interact with partner registration module NGAM partner registration 735 by sending the request objects within external events 740 and 750, respectively. Likewise, partner registration module NGAM partner registration 735 performs two functions. The first function is to receive the request objects transmitted by partner registration modules NGAM_PR Tool 711 and NGAM_PR Tool 721 and create response objects. The second function is to generate symmetric keys for partner registration and to interact with partner and trust module 736 to store the generated keys in system configuration 737. Therefore, according to the embodiment of the invention, partner registration modules NGAM_PR Tool 711, NGAM_PR Tool 721, and NGAM partner registration 735 can register a partner with a central server. These partner registration modules also are collectively identified as a "partner registration tool."

Figure 8:
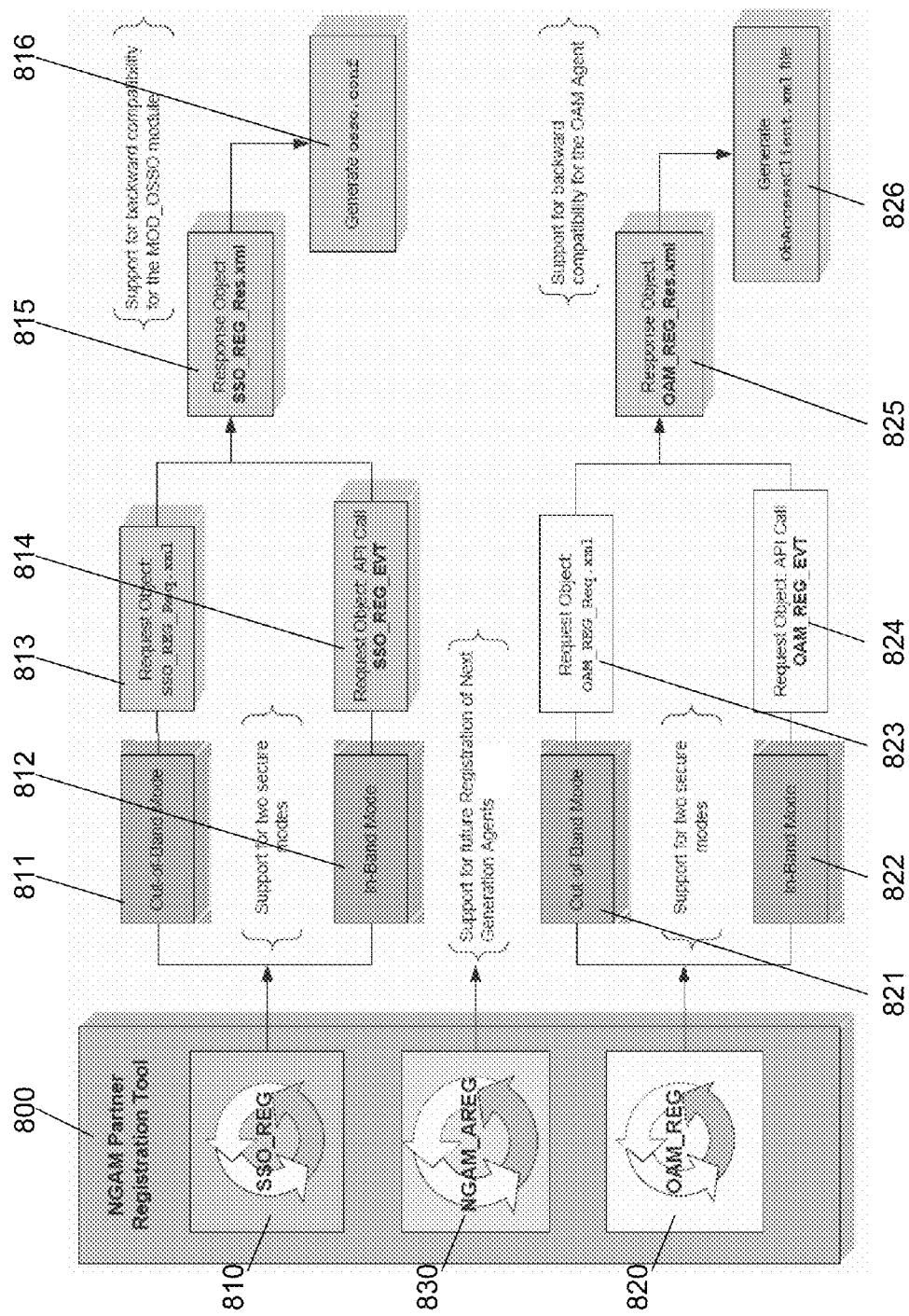
FIG. 8 illustrates another framework for a partner registration process according to an embodiment of the invention.

FIG. 8 illustrates another framework for a partner registration process according to an embodiment of the invention. FIG. 8 illustrates the functional modules of a partner registration tool (illustrated in FIG. 8 by NGAM partner registration tool 800). According to the embodiment of the invention, NGAM partner registration tool 800 includes two functional modules that can generate configuration files for OSSO and OAM partner registration processes, respectively. The functional module for the OSSO partner registration process is called OSSO_REGISTRATION_FUNCTION (identified in FIG. 8 as SSO_REG 810). The functional module for the OAM partner registration process is called OAM_REGISTRATION_FUNCTION (identified in FIG. 8 as OAM_REG 820). According to the embodiment, NGAM partner registration tool 800 also includes a functional module that can support any future agents, identified as "next generation agents." The functional module is called NGAM_AGENT_REGISTRATION_FUNCTION (identified in FIG. 8 as NGAM_A-REG 830).

According to the embodiment of the invention, functional module SSO_REG 810 can perform OSSO partner registration operations in two secure modes, out-of-band mode (identified in FIG. 8 as functional block 811) and in-band mode (identified in FIG. 8 as functional block 812). In an out-of-band mode, functional module SSO_REG 810 can create a request object used in the OSSO partner registration process, SSO_REG_Req.xml (identified in FIG. 8 as functional block 813). In an in-band mode, functional module SSO_REG 810 can create a request object used in the OSSO partner registration process, API call SSO_REG_EVT (identified in FIG. 8 as functional block 814). In either an out-of-band mode or an in-band mode, functional module SSO_REG 810 can create a response object used in the OSSO partner registration process, SSO_REG_Res.xml (identified in FIG. 8 as functional block 815). Functional module SSO_REG 810 can then use the response object to create a configuration file for the OSSO partner registration process, osso.conf file (identified in FIG. 8 as functional block 816).

According to the embodiment of the invention, functional module OAM_REG 820 can perform OAM partner registration operations in two secure modes, out-of-band mode (identified in FIG. 8 as functional block 821) and in-band mode (identified in FIG. 8 as functional block 822). In an out-of-band mode, functional module OAM_REG 820 can create a request object used in the OAM partner registration process, OAM_REG_Req.xml (identified in FIG. 8 as functional block 823). In an in-band mode, functional module OAM_REG 820 can create a request object used in the OAM partner registration process, API call OAM_REG_EVT (identified in FIG. 8 as functional block 824). In either an out-of-band mode or an in-band mode, functional module OAM_REG 820 can create a response object used in the OAM partner registration process, OAM_REG_Res.xml (identified in FIG. 8 as functional block 825). Functional module OAM_REG 820 can then use the response object to create a configuration file for the OAM partner registration process, ObAccessClient.xml file (identified in FIG. 8 as functional block 826).

Command Line Version of Partner Registration Tool

According to an embodiment of the invention, a version of a partner registration tool (i.e., partner registration tool 800 of FIG. 8) can be initiated from a command line interface. As one of ordinary skill in the art would readily appreciate, a command line interface is an interface which allows a user to interact with a software module by typing commands to perform specific tasks. The next section describes the command line version of the partner registration tool including the different parameters of the command line version. Below is an example of the command line version of the partner registration tool:

```
Command line: NGAM_REG_TOOL
    ToolLocation [Clnt, Srvr]
    PartnerType [OAM, OSSO, NGAM_Agent]
    SecureMode [In-Band, Out-of-Band]
    Input RegstrPr [Input (OAM_REG_Para/xml type file), Output]
    Output RgstrPr_Final [Input, Output]
```

The ToolLocation parameter identifies a version of the two versions of the partner registration tool to invoke. As previously discussed, the partner registration tool comprises a partner registration module that is run on a client (e.g., partner registration module NGAM_PR Tool 711 or partner registration module NGAM_PR Tool 721 of FIG. 7), and a partner registration module that is run on a server (e.g., NGAM partner registration module 735 of FIG. 7). The ToolLocation parameter can have one of two values: "Clnt" and "Srvr". The "Clnt" value invokes the partner registration module that is run on a client, and the "Srvr" value invokes the partner registration module that is run on a server. According to the embodiment, the ToolLocation parameter can have a default value of either "Clnt" or "Srvr." If a user types the ToolLocation parameter at a command line interface without also typing a value, the version of the partner registration tool that corresponds to the default value is invoked.

The PartnerType parameter identifies a partner type that is to be registered, and thus, identifies a functional module of the three functional modules configured to generate configuration files to invoke. As previously discussed, the partner registration tool comprises a functional module for the OSSO partner registration process (e.g., functional module SSO_REG 810 of FIG. 8), a functional module for the OAM partner registration process (e.g., functional module OAM_REG 820 of FIG. 8), and a functional module that can support next generation agents (e.g., functional module NGAM_A-REG 830 of FIG. 8). The PartnerType parameter can have one of three values: "OSSO," "OAM," and "NGAM_Agent." The "OSSO" value invokes the functional module for the OSSO partner registration process. The "OAM" value invokes the functional module for the OAM partner registration process. The "NGAM_Agent" value invokes the functional module that can support next generation agents. According to the embodiment, the PartnerType parameter can have a default value of either "OSSO,"

"OAM," or "NGAM_Agent." If a user types the PartnerType parameter at a command line interface without also typing a value, the functional module of the partner registration tool that corresponds to the default value is invoked.

The SecureMode parameter identifies a secure mode of the two secure modes that a partner registration process can operate in. As previously discussed, a partner registration process can operate in one of two secure modes, out-of-band mode and in-band mode. The SecureMode parameter can have one of two values: "Out-of-Band" and "In-Band." The "Out-of-Band" value indicates that the partner registration process should operate in an out-of-band mode, and the "In-Band" value indicates that the partner registration process should operate in an in-band mode. According to the embodiment, the SecureMode parameter can have a default value of either "Out-of-Band" or "In-Band." If a user types the SecureMode parameter at a command line interface without also typing a value, the partner registration process operates in a secure mode that corresponds to the default value.

The RgstrPr parameter is used to perform input and output partner registration processing, depending on a tool location, a partner type and a security mode. The RgstrPr parameter can take a file name as an input and a file name as an input.

In an embodiment where a PartnerType parameter includes a value of "OSSO," the RgstrPr parameter can be used to perform input and output OSSO partner registration processing. Specifically, in an embodiment where a ToolLocation parameter includes a value of "Clnt," a PartnerType parameter includes a value of "OSSO," and a SecurityMode parameter includes a value of "In-Band," the RgstrPr parameter can be used to generate an API call, SSO_REG_EVT, and to send the API call to a controller, as shown in the below example:

RgstrPr [OSSO_REG_Para, SSO_REG_EVT]

In an alternate embodiment, where a ToolLocation parameter includes a value of "Clnt," a PartnerType parameter includes a value of "OSSO," and a SecurityMode parameter includes a value of "Out-of-Band," the RgstrPr parameter can be used to generate an XML file, SSO_REG_Req.xml, and to send the XML file to a security administrator, as shown in the below example:

RgstrPr [OSSO_REG_Para, SSO_REG_Req.xml]

In an alternate embodiment, where a ToolLocation parameter includes a value of "Srvr," a PartnerType parameter includes a value of "OSSO," and a SecurityMode parameter includes a value of "In-Band," the RgstrPr parameter can be used to generate an XML file, SSO_REG_Res.xml, and to send the XML file to an application administrator, as shown in the below example:

RgstrPr [SSO_REG_EVT, SSO_REG_Res.xml]

In an alternate embodiment, where a ToolLocation parameter includes a value of "Srvr," a PartnerType parameter includes a value of "OSSO," and a SecurityMode parameter includes a value of "Out-of-Band," the RgstrPr parameter can be used to generate an XML file, SSO_REG_Res.xml, and to send the XML file to an application administrator, as shown in the below example:

RgstrPr [SSO_REG_Req.xml, SSO_REG_Res.xml]

In an embodiment where a PartnerType parameter includes a value of "OAM," the RgstrPr parameter can be used to perform input and output OAM partner registration processing. Specifically, in an embodiment where a ToolLocation parameter includes a value of "Clnt," a PartnerType parameter includes a value of "OAM," and a SecurityMode parameter includes a value of "In-Band," the RgstrPr parameter can be used to generate an API call, OAM_REG_EVT, and to send the API call to a controller, as shown in the below example:

RgstrPr [OAM_REG_Para, OAM_REG_EVT]

In an alternate embodiment, where a ToolLocation parameter includes a value of "Clnt," a PartnerType parameter includes a value of "OAM," and a SecurityMode parameter includes a value of "Out-of-Band," the RgstrPr parameter can be used to generate an XML file, OAM_REG_Req.xml, and to send the XML file to a security administrator, as shown in the below example:

RgstrPr [OAM_REG_Para, OAM_REG_Req.xml]

In an alternate embodiment, where a ToolLocation parameter includes a value of "Srvr," a PartnerType parameter includes a value of "OAM," and a SecurityMode parameter includes a value of "In-Band," the RgstrPr parameter can be used to generate an XML file, OAM_REG_Res.xml, and to send the XML file to an application administrator, as shown in the below example:

RgstrPr [OAM_REG_EVT, OAM_REG_Res.xml]

In an alternate embodiment, where a ToolLocation parameter includes a value of "Srvr," a PartnerType parameter includes a value of "OAM," and a SecurityMode parameter includes a value of "Out-of-Band," the RgstrPr parameter can be used to generate an XML file, OAM_REG_Res.xml, and to send the XML file to an application administrator, as shown in the below example:

RgstrPr [OAM_REG_Req.xml, OAM_REG_Res.xml]

The RgstrPr_Final parameter is used to generate a configuration file to confirm the partner registration process based on the partner type. The RgstrPr_Final parameter can take a file name as an input and a file name as an output. In an embodiment of the invention, the RgstrPr_Final parameter can be used to generate an OSSO configuration file, as shown in the below example:

RgstrPr_Final [SSO_REG_Res.xml, osso.conf]

In another embodiment of the invention, the RgstrPr_Final parameter can be used to generate an OAM configuration file, as shown in the below example:

RgstrPr_Final [OAM_REG_Res.xml, ObAccessClient.xml]

Partner Registration Process in an Out-of-Band Mode

Figure 9:
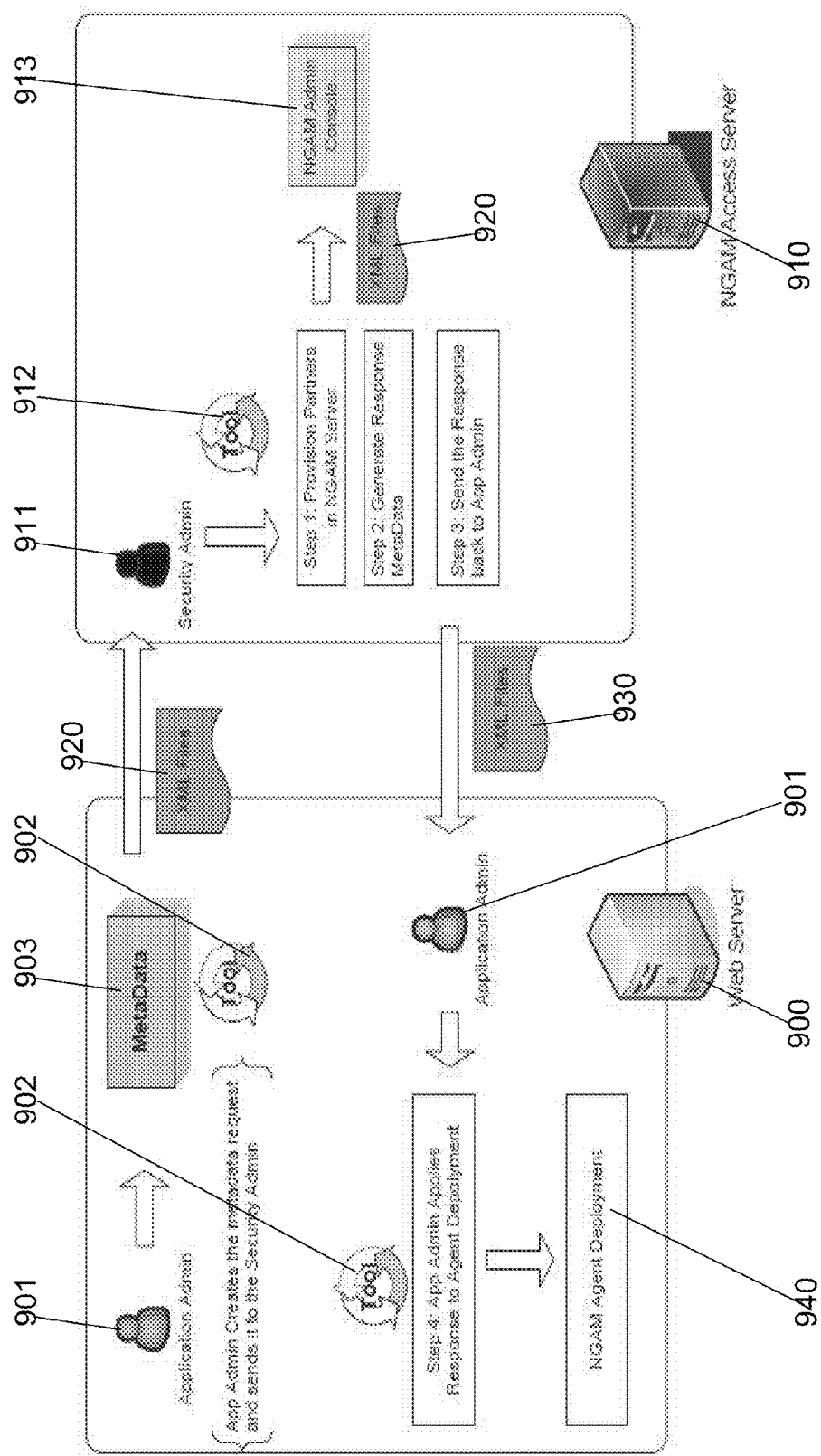
FIG. 9 illustrates a partner registration process in an out-of-band mode according to an embodiment of the invention.

FIG. 9 illustrates a partner registration process in an out-of-band mode according to an embodiment of the invention. As previously discussed, an out-of-band mode is one mode in which a partner registration process can take place according to an embodiment of the invention. The partner registration process illustrated in FIG. 9 can be any kind of partner registration process, such as an OSSO partner registration process or an OAM partner registration process. The embodiment includes web server 900 and NGAM access server 910.

According to the embodiment of the invention, at web server 900, an administrator of a partner application (identified in FIG. 9 as application admin 901) requests that a partner registration module that is run on a client (identified in FIG. 9 as tool 902) create a request object. Tool 902 creates a request object containing the specific partner application details and then transmits the request object to a security administrator (identified in FIG. 9 as security admin 911) at NGAM access server 910. In an embodiment where the partner registration process is an OSSO partner registration process, the request object contains a superset of elements based on the OSSO partner registration process. In an alternative embodiment where the partner registration process is an OAM partner registration process, the request object contains a superset of elements based on the OAM partner registration process.

According to the embodiment, tool 902 creates metadata 903 for the request object in an XML file format (identified in FIG. 9 as XML files 920), and transmits the request object to security admin 911. In an embodiment involving an OSSO partner registration process, metadata 903 produced by tool 902 includes an SSO_REG_Req.xml file with OSSO parameters in an XML format. In an alternate embodiment involving an OAM partner registration process, metadata 903 produced by tool 902 includes an OAM_REG_Req.xml file with OAM parameters in an XML format.

At NGAM access server 910, after receiving XML files 920, a partner registration module that is run on a server (identified in FIG. 9 as tool 912) interacts with tool 902 to provision the partner registration. Specifically, at step 1, according to the embodiment, security admin 911 provisions the partner in NGAM access server 910 using tool 912. The provisioning of the partner includes transmitting XML files 920 to NGAM admin console 913. At step 2, tool 912 receives a response and generates a response object in a format expected by application admin 901. At step 3, tool 912 transmits the response object in the format (identified in FIG. 9 as XML files 930) to application admin 901.

At step 4, application admin 901 applies the response object transmitted by security admin 911 using tool 902 to deploy the agent. The successful deployment of the agent is identified in FIG. 9 as NGAM agent deployment 940. According to the embodiment, backward compatibility is provided, and thus, the provisioning of current agents, such as OSSO and OAM agents does not change. For example, according to an embodiment, an OSSO functional module of tool 902 (not shown) can generate a modified osso.conf file configured to bootstrap a mod_osso module. According to an alternate embodiment, an OAM functional module of tool 902 (not shown) can generate an ObAccessClient.xml file configured to bootstrap an OAM webgate.

OSSO Partner Registration Process in an Out-of-Band Mode

Figure 10:
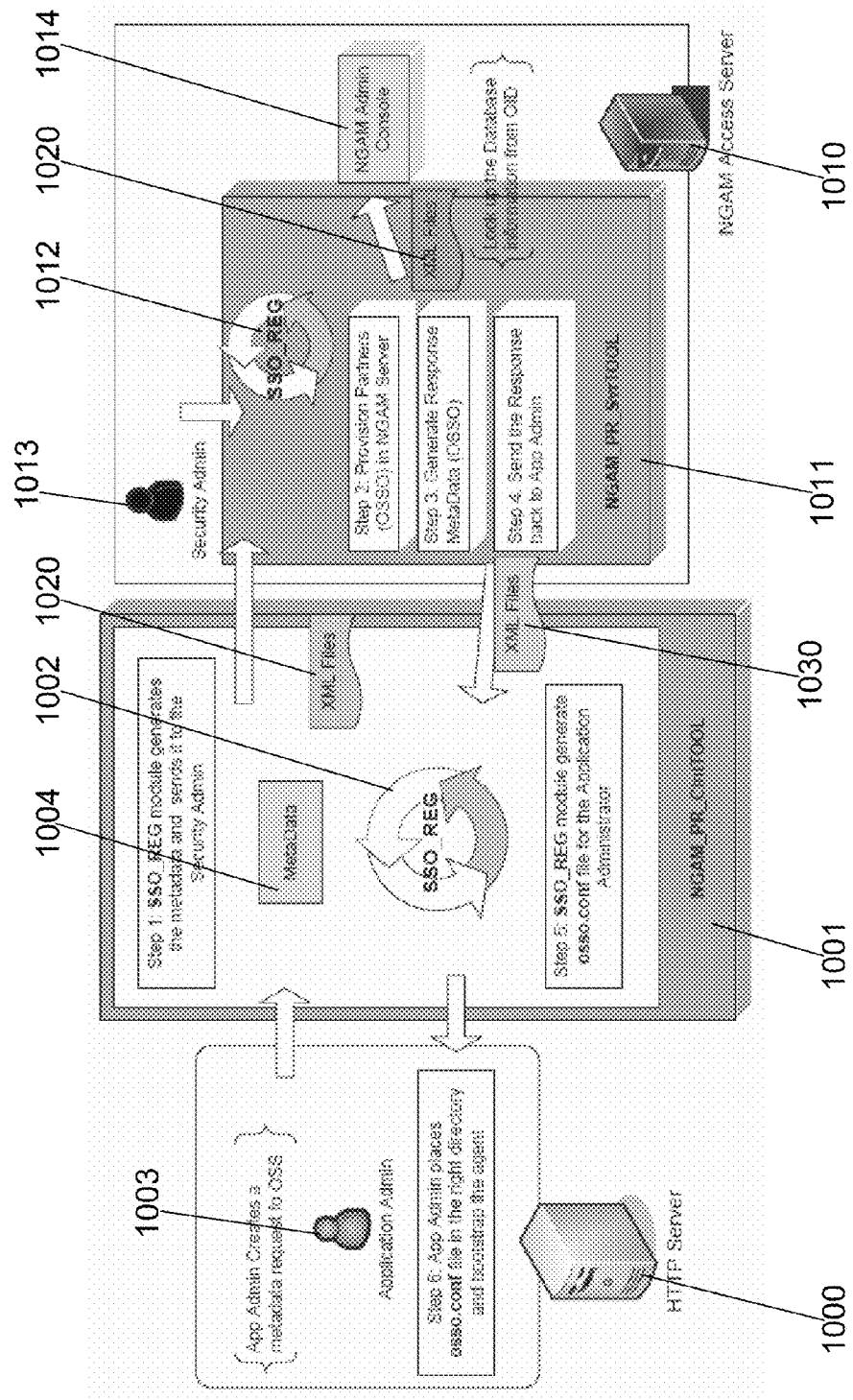
FIG. 10 illustrates an OSSO partner registration process in an out-of-band mode according to an embodiment of the invention.

FIG. 10 illustrates an OSSO partner registration process in an out-of-band mode according to an embodiment of the invention. The embodiment includes HTTP server 1000 (also identified as a web server) and NGAM access server 1010. The illustrated embodiment in FIG. 10 details how an OSSO functional module (identified in FIG. 10 as SSO_REG 1002 and SSO_REG 1012) of a partner registration tool (identified in FIG. 10 as NGAM_PR_ClntTOOL 1001 and NGAM_PR_SvrTOOL 1011) operates an OSSO partner registration process in an out-of-band mode. As shown in FIG. 10, the OSSO partner registration process is performed by modules SSO_REG 1002 and SSO_REG 1012. As also shown in FIG. 10, module NGAM_PR_ClntTOOL 1001 runs module SSO_REG 1002 for application admin 1003, and module NGAM_PR_SvrTOOL 1011 runs module SSO_REG 1012 for security admin 1013. As will be described below in more detail, modules SSO_REG 1002 and SSO_REG 1012 have different functions, but interact with each other during the OSSO partner registration process.

At step 1, module SSO_REG 1002 generates metadata (identified in FIG. 10 as metadata 1004) in response to a request by application admin 1003, where the metadata includes specific OSSO partner details, stores the metadata in an request object, SSO_REG_Req.xml (identified in FIG. 10 as XML files 1020), and sends the request object to security admin 1013. At step 2, module SSO_REG 1012 provisions the OSSO partner in the NGAM server. The provisioning of the partner includes transmitting XML files 1020 to NGAM admin console 1014. At step 3, module SSO_REG 1012 generates a response object, SSO_REG.xml (identified in FIG. 10 as XML files 1030). According to the embodiment, the response object is in the same XML file format as the request object.

At step 4, module SSO_REG 1012 transmits the response object back to application admin 1003. At step 5, module SSO_REG 1002 generates an osso.conf file based on the response object transmitted by module SSO_REG 1012. At step 6, application admin 1003 places the osso.conf file in the appropriate directory and bootstraps an OSSO agent (not shown) which resides at HTTP server 1000.

Command Line Version of Partner Registration Tool (OSSO/Out-of-Band)

To further understand the out-of-band OSSO partner registration process, the next section describes the command line version of the partner registration tool and parameters for an OSSO partner in an out-of-band mode. An example of the command line version of module NGAM_PR_ClntTOOL 1001, which produces a SSO_REG_Req.xml file, is shown below:

```
Command line: NGAM_REG_TOOL
    ToolLocation [Clnt]
    PartnerType [OSSO]
    SecureMode [Out-of-Band]
    RgstrPr [OSSO_REG_Para, SSO_REG_Req.xml]
    OSSO_REG Para [Specify the following]
    oracle_home_path orcl_home_path
    site_name site_name
    config_mod_osso TRUE
    mod_osso_url mod_osso_url
    [virtualhost]
    [update_mode CREATE | DELETE | MODIFY]
    [remote_midtier]
    [config_file config_file_path]
    [admin_info admin_info]
    [admin_id adminid]
```

The parameters ToolLocation, PartnerType, SecureMode, and RgstrPr have previously been described. To produce the SSO_REG_Req.xml file, the details of input file OSSO_REG_Para should be specified in the command line version of the partner registration tool. The details of OSSO_REG_Para are described below.

The oracle_home_path parameter indicates a directory path of an Oracle HTTP server. The site_name parameter indicates an effective host name and port of the partner application being registered by the partner registration process. The mod_osso_url parameter indicates an effective uniform resource locator ("URL") of the partner application. The virtualhost parameter is an optional parameter that is only included if an HTTP virtual host is being registered. The update_mode parameter is an optional parameter which causes the partner registration tool to either create a new partner registration record, delete an existing partner registration record, or modify an existing partner registration record. The remote_midtier parameter is an optional parameter which causes the partner registration tool to register the partner application at a remote midtier. The config_file parameter indicates the location of the osso.conf file. The parameter is optional except when the virtualhost parameter or the remote_midtier parameter is specified. The admin_info parameter is an optional parameter which indicates a user name of the mod_osso administration. The admin_id parameter is an optional parameter which indicates any additional information, such as an e-mail address, about the administrator.

Next, an example of a SSO_REG_Req.xml file is provided below:

```
<?xml version="1.0" encoding="utf-8" ?>
<OSSO_REGISTRATION_REQUEST>
    <oracle_home_path> Value <$ORACLE_HOME>
```

```
    <site_name> Value <http://myhostexample.mydomainexample.com>
    <config_mod_osso> Value <TRUE>
    <mod_osso_url> Value
    <http://myhostexample.mydomainexample.com>
    <virtualhost> Value <>
    <update_mode> Value <>
    <remote_midtier> Value <>
    <config_file> Value <>
    <admin_info> Value <>
    <admin_id> Value <>
</OSSO_REGISTRATION_REQUEST>
```

As can be seen in the above example, the parameters of the SSO_REG_Req.xml file are determined from the parameters of the OSSO_REG_Para input file.

Next, an example of the command line version of module NGAM_PR_SvrTOOL 1011, which produces a SSO_REG_Res.xml file, is shown below:

```
Command line: NGAM_REG_TOOL
    ToolLocation [Svr]
    PartnerType [OSSO]
    SecureMode [Out-of-Band]
    RgstrPr [SSO_REG_Req.xml, SSO_REG_Res.xml]
    OSSO_REG_Para [need not be specified]
```

As can be seen above, the detailed parameters of OSSO_REG_Para do not need to be specified.

token format to use. A cipher_key parameter indicates a shared key used to encrypt tokens. A site_id parameter identifies the partner application to a SSO server. A login_url parameter indicates a URL of the SSO server, in other words, the URL that a user of a partner application is redirected for authentication. A logout_url parameter indicates where to redirect a user of a partner application to invoke a global SSO logout.

Next, an example of the command line version of module NGAM_PR_ClntTOOL 1011, which produces an osso.conf file, is shown below:

```
Command line: NGAM_REG_TOOL
    ToolLocation [Clnt]
    PartnerType [OSSO]
    SecureMode [Out-of-Band]
    RgstrPr_Final [SSO_REG_Res.xml, osso.conf]
    OSSO_REG_Para [need not be specified]
```

As can be seen above, the detailed parameters of OSSO_REG_Para do not need to be specified.

Next, an example of an osso.conf file is provided below:

```
sso_server_version=v1.4
cipher_key=34F4567GF5V6VB9D
site_id=65D4J453
site_token=L1453574765D4J453
login_url=http://example.com:6500/user/user.wwssso_app_admin.ls_login
logout_url=http://example.com:6500/user/user.wwssso_app_admin.ls_logout
cancel_url=http://example.com:6500
sso_timeout_cookie_name=OSSO_USEREXAMPLE_CTX
sso_timeout_cookie_key=E3465B45678436C
nonssl_sso_port=5000
```

Next, an example of a SSO_REG_Res.xml file is provided below:

```
<?xml version="1.0" encoding="utf-8" ?>
<OSSO_REGISTRATION_RESPONSE>
    <sso_server_version> Value <v1.4>
    <cipher_key> Value <34F4567GF5V6VB9D>
    <site_id> Value <65D4J453>
    <site_token> Value <L1453574765D4J453>
    <login_url> Value <
    http://example.com:6500/user/user.wwsso_app_admin.ls_login>
    <logout_url> Value <
    http://example.com:6500/user/user.wwsso_app_admin.ls_logout>
    <cancel_url> Value <http://example.com:6500>
    <sso_timeout_cookie_name> Value
    <OSSO_USEREXAMPLE_CTX>
    <sso_timeout_cookie_key> Value <E3465B45678436C>
    <nonssl_sso_port> Value <5000>
</OSSO_REGISTRATION_RESPONSE>
```

The SSO_REG_Res.xml file can be a basis for creating a osso.conf file. A sso_server_version parameter identifies a The parameters of the osso.conf file are the same as the parameters for the SSO_REG_Res.xml file described above.

OAM Partner Registration Process in an Out-of-Band Mode

Figure 11:
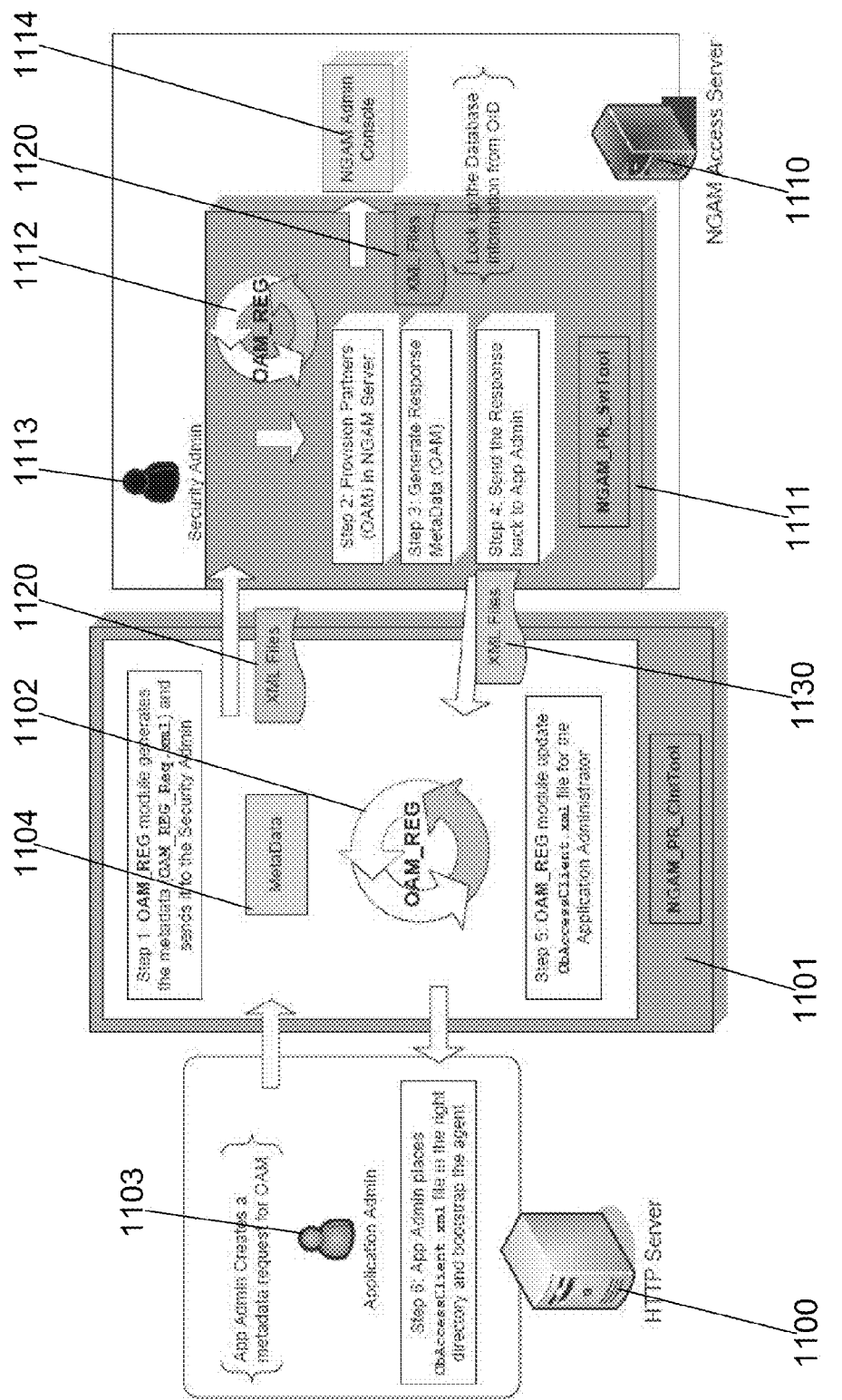
FIG. 11 illustrates an OAM partner registration process in an out-of-band mode according to an embodiment of the invention.

FIG. 11 illustrates an OAM partner registration process in an out-of-band mode according to an embodiment of the invention. The embodiment includes HTTP server 1100 (also identified as a web server) and NGAM access server 1110. The illustrated embodiment in FIG. 11 details how an OAM functional module (identified in FIG. 11 as OAM_REG 1102 and OAM_REG 1112) of a partner registration tool (identified in FIG. 11 as NGAM_PR_ClntTOOL 1101 and NGAM_PR_SvrTOOL 1111) operates an OAM partner registration process in an out-of-band mode. As shown in FIG. 11, the OAM partner registration process is performed by modules OAM_REG 1102 and OAM_REG 1112. As also shown in FIG. 11, module NGAM_PR_ClntTOOL 1101 runs module OAM_REG 1102 for application admin 1103, and module NGAM_PR_SvrTOOL 1111 runs module OAM_REG 1112 for security admin 1113. As will be described below in more detail, modules OAM_REG 1102 and OAM_REG 1112 have different functions, but interact with each other during the OAM partner registration process.

At step 1, module OAM_REG 1102 generates metadata (identified in FIG. 11 as metadata 1104) in response to a request by application admin 1103, where the metadata includes specific OAM partner details, stores the metadata in an request object, OAM_REG_Req.xml (identified in FIG. 11 as XML files 1120), and sends the request object to security admin 1113. At step 2, module OAM_REG 1112 provisions the OAM partner in the NGAM server. The provisioning of the partner includes transmitting XML files 1120 to NGAM Admin Console 1114. At step 3, module OAM_REG 1112 generates a response object, OAM_REG_Res.xml (identified in FIG. 11 as XML files 1130). According to the embodiment, the response object is in the same XML file format as the request object.

At step 4, module OAM_REG 1112 transmits the request object back to application admin 1103. At step 5, module OAM_REG 1102 generates an ObAccessClient.xml file based on the response object transmitted by module OAM_REG 1112. At step 6, application admin 1103 places the ObAccessClient.xml file in the appropriate directory and bootstraps an OAM agent (not shown) which resides at HTTP server 1100.

Thus, according to the embodiment of the invention, modules OAM_REG 1102 and OAM_REG 1112 support configuration operations between HTTP server 1100 and NGAM access server 1110 to exchange a request object and a response object, and to produce an ObAccessClient.xml file. In the embodiment, there can be frequently polling to exchange configuration parameters between HTTP server 1100 and NGAM access server 1110.

Command Line Version of Partner Registration Tool (OAM/Out-of-Band)

To further understand the out-of-band OAM partner registration process, the next section describes the command line version of the partner registration tool and parameters. An example of the command line version of module NGAM_PR_ClntTOOL 1101, which produces an OAM_REG_Req.xml file, is shown below:

```
Command line: NGAM_REG_TOOL
    ToolLocation [Clnt]
    PartnerType [OAM]
    SecureMode [Out-of-Band]
    RgstrPr [OAM_REG_Para, OAM_REG_Req.xml]
    OAM_REG_Para [Parameters need to be specified]
```

To produce the OAM_REG_Req.xml file, the details of parameter file OAM_REG_Para can be specified in the command line version of module NGAM_PR_ClntTOOL 1101. The OAM_REG_Para file includes the following parameters: Name, Hostname, Port, Debug, Debug File Name, Transport Security, Maximum Client Session Time, Number of Threads, Policy Manager API Support Mode, Audit to Database, Audit to File, Audit File Name, Audit File Size, Buffer Size, File Rotation Interval, Engine Configuration Refresh Period, URL Prefix Reload Period, Password Policy Reload Period, Maximum Elements in User Cache, User Cache Timeout, Maximum Elements in Policy Cache, Policy Cache Timeout, SNMP State, SNMP Agent Registration Port, Session Token Cache, and Maximum Elements in Session Token Cache.

The Name parameter identifies the name of the access server. The Hostname parameter identifies the name of the web server that is hosting the access server. The Port parameter indicates the port number the access server is listening to. The Debug parameter indicates whether debugging is on or off. The Debug File Name parameter indicates the name of the access server's debug file.

The Transport Security parameter indicates a level of transport security to and from the access server. Available options are: (1) Open; (2) Simple; and (3) Cert. Open indicates no transport security. Simple indicates encrypted transport security with prepackaged certificates. Cert indicates encrypted transport security. The Maximum Client Session Time parameter indicates a duration, in hours, for a connection between an access gate and an access server. The Number of Threads parameter indicates a maximum number of service threads allowed on the access server. By default, the number of threads is set to 60. The Policy Manager API Support Mode parameter indicates whether a policy manager engine within the access server is enabled.

The Audit to Database parameter indicates that audit information is to be written to a database. The Audit to File parameter indicates that audit information is to be written to a file. The Audit File Name parameter indicates a path of an audit file. The Audit File Size parameter indicates a maximum size of an audit buffer, in bytes. The Buffer Size parameter indicates a size of an audit buffer in bytes. The File Rotation Interval indicates a time, in seconds, that an audit file can exist.

The Engine Configuration Refresh Period parameter indicates a frequency, in seconds, of configuration updates to an access server. The URL Prefix Reload Period indicates a frequency, in seconds, with which new URLs are recognized by the access server. The Password Policy Reload Period indicates a frequency, in seconds, with which new password policies are recognized by the access server.

The Maximum Elements in User Cache parameter indicates a number of authenticated users that can be saved in a cache for the access server. The User Cache Timeout parameter indicates a maximum time, in seconds, for inactive user data to reside in cache. The Maximum Elements in Policy Cache parameter indicates a maximum number of elements that can be stored in a policy cache. The Policy Cache Timeout parameter indicates a maximum time, in seconds, for inactive policy data to reside in cache.

The SNMP State parameter specifies whether Simple Network Management Protocol ("SNMP") is enabled or not. The SNMP Agent Registration Port parameter indicates a port number of the SNMP agent. The Session Token Cache parameter enables a session token cache that can be used when decrypting a user's session token on an access server. The Maximum Elements in Session Token Cache parameter indicates a maximum number of decrypted session tokens that can be kept in a cache.

Next, an example of a OAM_REG_Req.xml file is provided below:

```
<?xml version="1.0" encoding="utf-8" ?>
<CompoundList xmlns="http://www.example.com" ListName=" OAM_REG_Req.tmp">
    <SimpleList> <NameValPair ParamName="id" Value = "wburn" /> </SimpleList>
    <SimpleList> <NameValPair ParamName="accessClientPasswd" Value = "" />
</SimpleList>
    <SimpleList> <NameValPair ParamName="primaryCookieDomain" Value = "" />
</SimpleList>
```

-continued

```
    <SimpleList> <NameValPair ParamName="preferredHost" Value = "crams09" />
</SimpleList>
    <SimpleList> <NameValPair ParamName="maxCacheElems" Value = "100000" />
</SimpleList>
    <SimpleList> <NameValPair ParamName="cacheTimeout" Value = "1800" />
</SimpleList>
    <SimpleList> <NameValPair ParamName="cookieSessionTime" Value = "3600" />
</SimpleList>
    <SimpleList> <NameValPair ParamName="maxConnections" Value = "1" />
</SimpleList>
    <SimpleList> <NameValPair ParamName="maxSessionTime" Value = "24" />
</SimpleList>
    <SimpleList> <NameValPair ParamName="idleSessionTimeout" Value = "3600" />
</SimpleList>
    <SimpleList> <NameValPair ParamName="failoverThreshold" Value = "1" />
</SimpleList>
    <SimpleList> <NameValPair ParamName="aaaTimeoutThreshold" Value = "-1" />
</SimpleList>
    <SimpleList> <NameValPair ParamName="sleepFor" Value = "60" /> </SimpleList>
    <SimpleList> <NameValPair ParamName="debug" Value = "false" /> </SimpleList>
    <SimpleList> <NameValPair ParamName="security" Value = "open" /> </SimpleList>
    <SimpleList> <NameValPair ParamName="denyOnNotProtected" Value = "0" />
</SimpleList>
    <SimpleList> <NameValPair ParamName="cachePragmaHeader" Value = "no-cache"
/> </SimpleList>
    <SimpleList> <NameValPair ParamName="cacheControlHeader" Value = "no-cache"
/> </SimpleList>
    <SimpleList> <NameValPair ParamName="ipValidation" Value = "1" /> </SimpleList>
    <ValList xmlns="http://www.example.com" ListName="primary_server_list">
        <ValListMember Value="primaryServer1" /> </ValList>
    <ValNameList xmlns="http://www.example.com" ListName="primaryServer1">
        <NameValPair ParamName="host" Value="mike42" />
        <NameValPair ParamName="port" Value="4444" />
        <NameValPair ParamName="numOfConnections" Value="1" />
    </ValNameList>
    <ValNameList xmlns="http://www.example.com" ListName="secondary_serverlist">
</CompoundList>
```

Next, an example of the command line version of module NGAM_PR_SvrTOOL 1111, which produces a OAM_REG_Res.xml file, is shown below:

```
Command line: NGAM_REG_TOOL
    ToolLocation [Srvr]
    PartnerType [OAM]
    SecureMode [Out-of-Band]
```

-continued

```
    RgstrPr [OAM_REG_Req.xml, OAM_REG_Res.xml]
    OAM_REG Para [Parameters need to be specified]
```

The detailed parameters of OAM_REG_Para are described above.

Next, an example of a OAM_REG_Res.xml file is provided below:

```
<?xml version="1.0" encoding="utf-8" ?>
<CompoundList xmlns="http://www.example.com" ListName=" OAM_REG_Req.tmp">
    <SimpleList> <NameValPair ParamName="id" Value = "wburn" /> </SimpleList>
    <SimpleList> <NameValPair ParamName="debugFileName" Value = "" />
</SimpleList>
    <SimpleList> <NameValPair ParamName="auditToDatabase" Value = "" />
</SimpleList>
    <SimpleList> <NameValPair ParamName="auditToFile" Value = "" /> </SimpleList>
    <SimpleList> <NameValPair ParamName="maxConnections" Value = "1" />
</SimpleList>
    <SimpleList> <NameValPair ParamName="maxSessionTime" Value = "24" />
</SimpleList>
    <SimpleList> <NameValPair ParamName="auditFileSize" Value = "3600" />
</SimpleList>
    <SimpleList> <NameValPair ParamName="fileRotationInterval" Value = "1" />
</SimpleList>
    <SimpleList> <NameValPair ParamName="aaaTimeoutThreshold" Value = "-1" />
</SimpleList>
    <SimpleList> <NameValPair ParamName="maxPolicyCacheElems" Value = "60" />
</SimpleList>
    <SimpleList> <NameValPair ParamName="debug" Value = "false" /> </SimpleList>
    <SimpleList> <NameValPair ParamName="security" Value = "open" /> </SimpleList>
    <SimpleList> <NameValPair ParamName="policyCacheTimeout" Value = "0" />
</SimpleList>
```

```
    <SimpleList> <NameValPair ParamName="maxCacheElems" Value = "100000" />
</SimpleList>
    <SimpleList> <NameValPair ParamName="cacheTimeout" Value = "1800" />
</SimpleList>
    <SimpleList> <NameValPair ParamName="cookieSessionTime" Value = "3600" />
</SimpleList>
    <SimpleList> <NameValPair ParamName="maxCookieSessionElems" Value = "" />
</SimpleList>
    <ValList xmlns="http://www.example.com" ListName="primary_server_list">
        <ValListMember Value="primaryServer1" /> </ValList>
    <ValNameList xmlns="http://www.example.com" ListName="primaryServer1">
        <NameValPair ParamName="host" Value="mike42" />
        <NameValPair ParamName="port" Value="4444" />
        <NameValPair ParamName="numOfConnections" Value="1" />
    </ValNameList>
    <ValNameList xmlns="http://www.example.com" ListName="secondary_serverlist">
</CompoundList>
```

Next, an example of the command line version of module NGAM_PR_ClntTOOL 1101, which produces an ObAccessClient.xml file, is shown below:

```
Command line: NGAM_REG_TOOL
    ToolLocation [Clnt]
    PartnerType [OAM]
    SecureMode [Out-of-Band]
```

```
    RgstrPr_Final [OAM_REG_Res.xml, ObAccessClient.xml]
    OAM_REG Para [Parameters need not be specified]
```

As can be seen above, the detailed parameters of OSSO_REG_Para do not need to be specified.

Next, an example of an ObAccessClient.xml file is provided below:

```
<?xml version="1.0" encoding="utf-8" ?>
<CompoundList xmlns="http://www.example.com" ListName=" OAM_REG_Req.tmp">
    <SimpleList> <NameValPair ParamName="id" Value = "wburn" /> </SimpleList>
    <SimpleList> <NameValPair ParamName="accessClientPasswd" Value = "" />
</SimpleList>
    <SimpleList> <NameValPair ParamName="primaryCookieDomain" Value = "" />
</SimpleList>
    <SimpleList> <NameValPair ParamName="preferredHost" Value = "crams09" />
</SimpleList>
    <SimpleList> <NameValPair ParamName="maxCacheElems" Value = "100000" />
</SimpleList>
    <SimpleList> <NameValPair ParamName="cacheTimeout" Value = "1800" />
</SimpleList>
    <SimpleList> <NameValPair ParamName="cookieSessionTime" Value = "3600" />
</SimpleList>
    <SimpleList> <NameValPair ParamName="maxConnections" Value = "1" />
</SimpleList>
    <SimpleList> <NameValPair ParamName="maxSessionTime" Value = "24" />
</SimpleList>
    <SimpleList> <NameValPair ParamName="idleSessionTimeout" Value = "3600" />
</SimpleList>
    <SimpleList> <NameValPair ParamName="failoverThreshold" Value = "1" />
</SimpleList>
    <SimpleList> <NameValPair ParamName="aaaTimeoutThreshold" Value = "-1" />
</SimpleList>
    <SimpleList> <NameValPair ParamName="sleepFor" Value = "60" /> </SimpleList>
    <SimpleList> <NameValPair ParamName="debug" Value = "false" /> </SimpleList>
    <SimpleList> <NameValPair ParamName="security" Value = "open" /> </SimpleList>
    <SimpleList> <NameValPair ParamName="denyOnNotProtected" Value = "0" />
</SimpleList>
    <SimpleList> <NameValPair ParamName="cachePragmaHeader" Value = "no-cache"
/> </SimpleList>
    <SimpleList> <NameValPair ParamName="cacheControlHeader" Value = "no-cache"
/> </SimpleList>
    <SimpleList> <NameValPair ParamName="ipValidation" Value = "1" /> </SimpleList>
    <ValList xmlns="http://www.example.com" ListName="primary_server_list">
        <ValListMember Value="primaryServer1" /> </ValList>
    <ValNameList xmlns="http://www.example.com" ListName="primaryServer1">
        <NameValPair ParamName="host" Value="mike42" />
        <NameValPair ParamName="port" Value="4444" />
        <NameValPair ParamName="numOfConnections" Value="1" />
    </ValNameList>
```

```
<ValNameList xmlns="http://www.example.com" ListName="secondary_serverlist">
</CompoundList>
```

The ObAccessClient.xml file includes the following configuration parameters: AccessGate, Description, State, Hostname, Port, AccessGate Password, Debug, Maximum User Session Time, Idle Session Time, Maximum Connections, Transport Security, IPValidation, IPValidation Exception, Maximum Client Session Time, Failover Threshold, Access Server Timeout Threshold, Sleep For, Maximum Elements in Cache, Cache Timeout, Impersonation Username, Impersonation Password, Policy Manager API Support Mode, Primary HTTP Cooke Domain, Preferred HTTP Host, DenyOnNotProtected, CachePragmaHeader, CacheControlHeader, LogOutUrls, and User-Defined Parameters.

The AccessGate parameter indicates the name of an access gate. The Description parameter indicates additional information to identify the access gate. The State parameter indicates whether the access gate is enabled or disabled. The Hostname parameter indicates a name of the machine hosting the access gate. The Port parameter identifies a web server port protected by the access gate when deployed as a web gate. The Port parameter is an optional parameter.

The AccessGate Password parameter indicates a unique password for the access gate. The Debug parameter enables debugging. The Maximum User Session Time parameter indicates a maximum amount of time in seconds that a user's authentication session is valid, regardless of their activity. The Idle Session Time parameter indicates an amount of time in seconds that a user's authentication session remains valid without accessing any resources protected by the access gate. The Maximum Connections parameter indicates a maximum number of connections that an access gate can establish. The AccessGate Password parameter is an optional parameter.

The Transport Security parameter indicates a level of transport security to and from the access server. Available options are: (1) Open; (2) Simple; and (3) Cert. Open indicates no transport security. Simple indicates encrypted transport security with prepackaged certificates. Cert indicates encrypted transport security. The IPValidation parameter is used to determine whether a client's IP address is the same as a stored IP address generated for single sign-on. The IPValidationException parameter indicates a list of IP addresses that are excluded from IP address validation. The Maximum Client Session Time parameter indicates a maximum amount, in hours, for a connection maintained to the access server by the access gate. The Failover Threshold parameter indicates a number that represents a point where an access gate opens connections to secondary access servers.

The Access Server Timeout Threshold indicates a number in seconds to wait for a response from the access server. The Sleep For parameter indicates a number in seconds that represents how often the access gate checks its connections to access server. The Maximum Elements in Cache parameter indicates a number of elements maintained in the cache. The Cache Timeout parameter indicates an amount of time that cached information remains in a cache of the access gate when neither used nor references.

The Impersonation Username parameter indicates a name of a trusted user created to be a user for impersonations. The Impersonation Password parameter indicates a password for the trusted user to be used for impersonation. The Policy Manager API Support Mode parameter indicates whether a policy manager engine within the access server is enabled.

The Primary HTTP Cookie Domain parameter describes a web server domain on which an access gate is deployed. The Preferred HTTP Host parameter defines how a host name appears in all HTTP requests when a user attempts to access a protected web server.

The DenyOnNotProtected parameter determines whether all requests for web pages on a web server protected by a web gate are denied unless access is explicitly allowed by a policy. The CachePragmaHeader and CacheControlHeader parameter each control a browser's cache. The LogOutUrls parameter configures one or more specific URLs that log out a user. The User-Defined Parameters parameter allows a user to define his own set of parameters.

Partner Registration Process in an In-Band Mode

Figure 12:
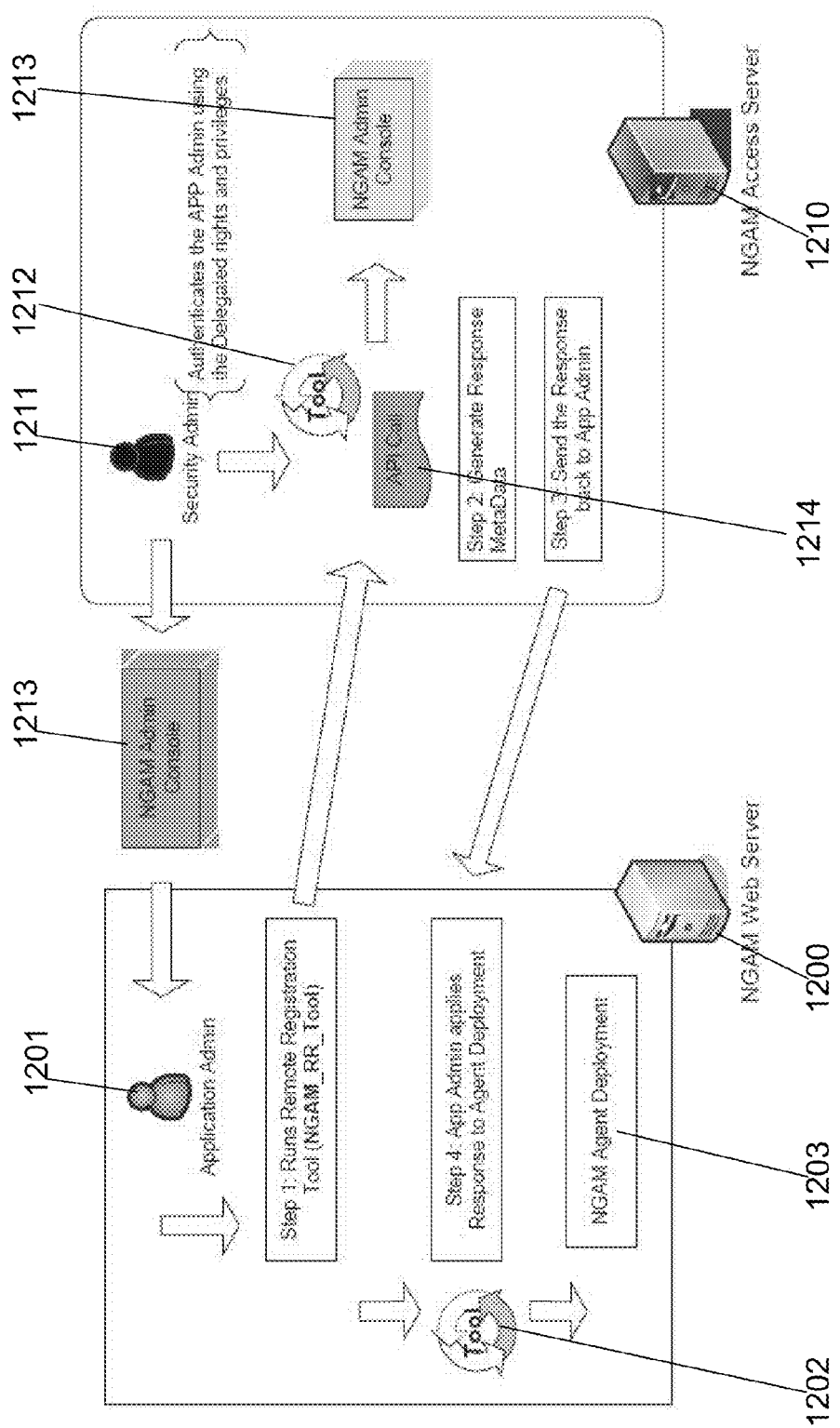
FIG. 12 illustrates a partner registration process in an in-band mode according to an embodiment of the invention.

FIG. 12 illustrates a partner registration process in an in-band mode according to an embodiment of the invention. As previously discussed, an in-band mode is one mode in which a partner registration process can take place according to an embodiment of the invention. The partner registration process illustrated in FIG. 12 can be any kind of partner registration process, such as an OSSO partner registration process or an OAM partner registration process. The embodiment includes NGAM web server 1200 and NGAM access server 1210.

According to the embodiment of the invention, at NGAM access server 1210, a security administrator (identified in FIG. 12 as security admin 1211) delegates provisioning rights to an application administrator (identified in FIG. 12 as application admin 1201) of NGAM web server 1200 using NGAM admin console 1213. After security admin 1211 has delegated provisioning rights to application admin 1201, application admin 1201 can use NGAM admin console 1213 or a partner registration tool (identified in FIG. 12 as tool 1202), utilizing specific credentials and authorizations provided by security admin 1211.

At step 1, according to the embodiment of the invention, application admin 1201 runs a remote registration tool. According to the embodiment, the remote registration tool includes tool 1202. Tool 1202 can contain parameters based on the types of agents (e.g., OSSO or OAM agents). For an OSSO partner registration process, a functional module of tool 1202 has specific parameters for an OSSO agent. For an OAM partner registration process, a functional module of tool 1202 has specific parameters for an OAM agent. According to the embodiment, tool 1202 then transmits an external event (identified in FIG. 12 as API call 1214) to a NGAM controller (e.g., SSO controller) (not shown). API call 1214 automatically registers the partner application with the NGAM server using NGAM admin console 1213.

At step 2, based on API call 1214, a partner registration tool (identified in FIG. 12 as tool 1212) creates a response object. The generated response object can be a specific format expected by an agent, such as an OSSO agent or an OAM agent. For example, in an OSSO partner registration process, the response object can be used to create an osso.conf file. As another example, in a OAM partner registration process, the response object can be used to create an ObAccessClient.xml file.

At step 3, tool 1212 sends the response object to tool 1202 at NGAM web server 1200. At step 4, tool 1202 applies the response object to deploy and restart a specific agent (such as an OSSO agent or an OAM agent) for bootstrapping of a communication between the agent and NGAM access server 1210. In other words, tool 1202 interacts with the agent (e.g., OSSO agent or OAM agent) to support backward compatibility. In an embodiment implementing an OSSO partner registration process, a functional module of tool 1202 produces an osso.conf file. In an alternate embodiment implementing an OAM partner registration process, a functional module of tool 1202 produces an ObAccessClient.xml file.

OSSO Partner Registration Process in an In-Band Mode

Figure 13:
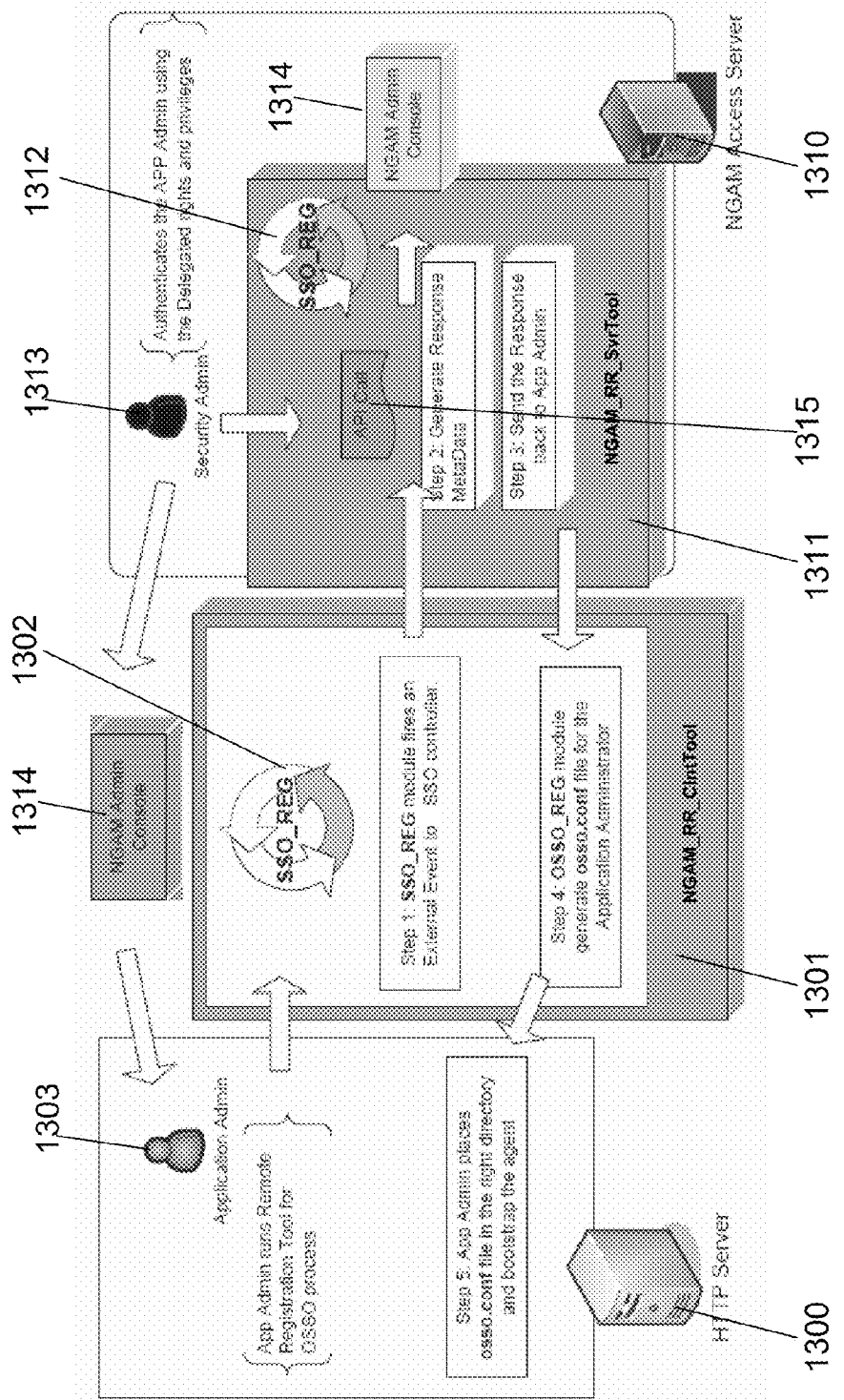
FIG. 13 illustrates an OSSO partner registration process in an in-band mode according to an embodiment of the invention.

FIG. 13 illustrates an OSSO partner registration process in an in-band mode according to an embodiment of the invention. The embodiment includes HTTP server 1300 and NGAM access server 1310. The illustrated embodiment in FIG. 13 details how an OSSO functional module (identified in FIG. 13 as SSO_REG 1302 and SSO_REG 1312) of a remote partner registration tool (identified in FIG. 13 as NGAM_RR_ClntTool 1301 and NGAM_RR_SvrTool 1311) operates an OSSO partner registration process in an in-band mode. As shown in FIG. 13, the OSSO partner registration process is performed by modules SSO_REG 1302 and SSO_REG 1312. As also shown in FIG. 13, module NGAM_RR_ClntTool 1301 runs module SSO_REG 1302 for application admin 1303, and module NGAM_RR_SvrTool 1311 runs module SSO_REG 1312 for security admin 1313. As will be described below in more detail, modules SSO_REG 1302 and SSO_REG 1312 have different functions, but interact with each other during the OSSO partner registration process.

According to the embodiment of the invention, at NGAM access server 1310, security admin 1313 delegates provisioning rights to application admin 1303 of HTTP server 1300 using NGAM admin console 1314. After security admin 1313 has delegated provisioning rights to application admin 1303, application admin 1303 can use NGAM admin console 1314 or module SSO_REG 1302, utilizing specific credentials and authorizations provided by security admin 1313. Application admin 1313 then runs a remote registration tool (i.e., modules NGAM_RR_ClntTool 1301 and NGAM_RR_SvrTool 1311) for an OSSO partner registration process.

At step 1, module SSO_REG 1302 creates an external event and transmits the external event to a SSO controller (not shown), upon a request from application admin 1313. According to the embodiment of the invention, the external event can be created as an API call, "OSSO_Partner_Registration_Event" or "SSO_REG_EVT" (identified in FIG. 13 as API call 1315). Module SSO_REG 1312 receives API call 1315, sent by module SSO_REG 1302 via the SSO controller (not shown), and automatically registers the partner application using NGAM admin console 1314. At step 2, module SSO_REG 1312 generates a response object, SSO_REG_Res.xml, based on API call 1315. According to the embodiment, the response object is in an XML file format expected by application admin 1313. At step 3, module SSO_REG 1312 transmits the response object back to application admin 1313.

At step 4, module SSO_REG 1302 generates an osso.conf file based on the response object transmitted by module SSO_REG 1312. At step 5, application admin 1303 places the osso.conf file in the appropriate directory and bootstraps an OSSO agent (not shown) which resides at HTTP server 1300.

Command Line Version of Partner Registration Tool (OSSO/In-Band)

To further understand the in-band OSSO partner registration process, the next section describes the command line version of the partner registration tool and parameters for an OSSO partner in an in-band mode. An example of the command line version of module NGAM_RR_ClntTOOL 1301, which initiates the OSSO partner registration process in an in-band mode, is shown below:

```
Command line: NGAM_REG_TOOL
    ToolLocation [Clnt]
    PartnerType [OSSO]
    SecureMode [In-Band]
    RgstrPr [OSSO_REG_Para, SSO_REG_EVT]
    OSSO_REG Para [Parameters need to be specified]
```

The detailed parameters of OSSO_REG_Para are described above in relation to the OSSO partner registration process in an out-of-band mode.

Next, an example of the command line version of module NGAM_RR_SvrTOOL 1311, which produces a SSO_REG_Res.xml file, is shown below:

```
Command line: NGAM_REG_TOOL
    ToolLocation [Srvr]
    PartnerType [OSSO]
    SecureMode [In-Band]
    RgstrPr [SSO_REG_EVT, SSO_REG_Res.xml]
    OSSO_REG Para [Parameters need not be specified]
```

As can be seen above, the detailed parameters of OSSO_REG_Para do not need to be specified.

Next, an example of the command line version of module NGAM_RR_ClntTOOL 1311, which produces an osso.conf file, is shown below:

```
Command line: NGAM_REG_TOOL
    ToolLocation [Clnt]
    PartnerType [OSSO]
    SecureMode [In-Band]
    RgstrPr_Final [SSO_REG_Res.xml, osso.conf]
    OSSO_REG_Para [need not be specified]
```

The parameters of the osso.conf file are the same as the parameters for the SSO_REG_Res.xml file described above in relation to the OSSO partner registration process in an out-of-band mode.

OAM Partner Registration Process in an In-Band Mode

Figure 14:
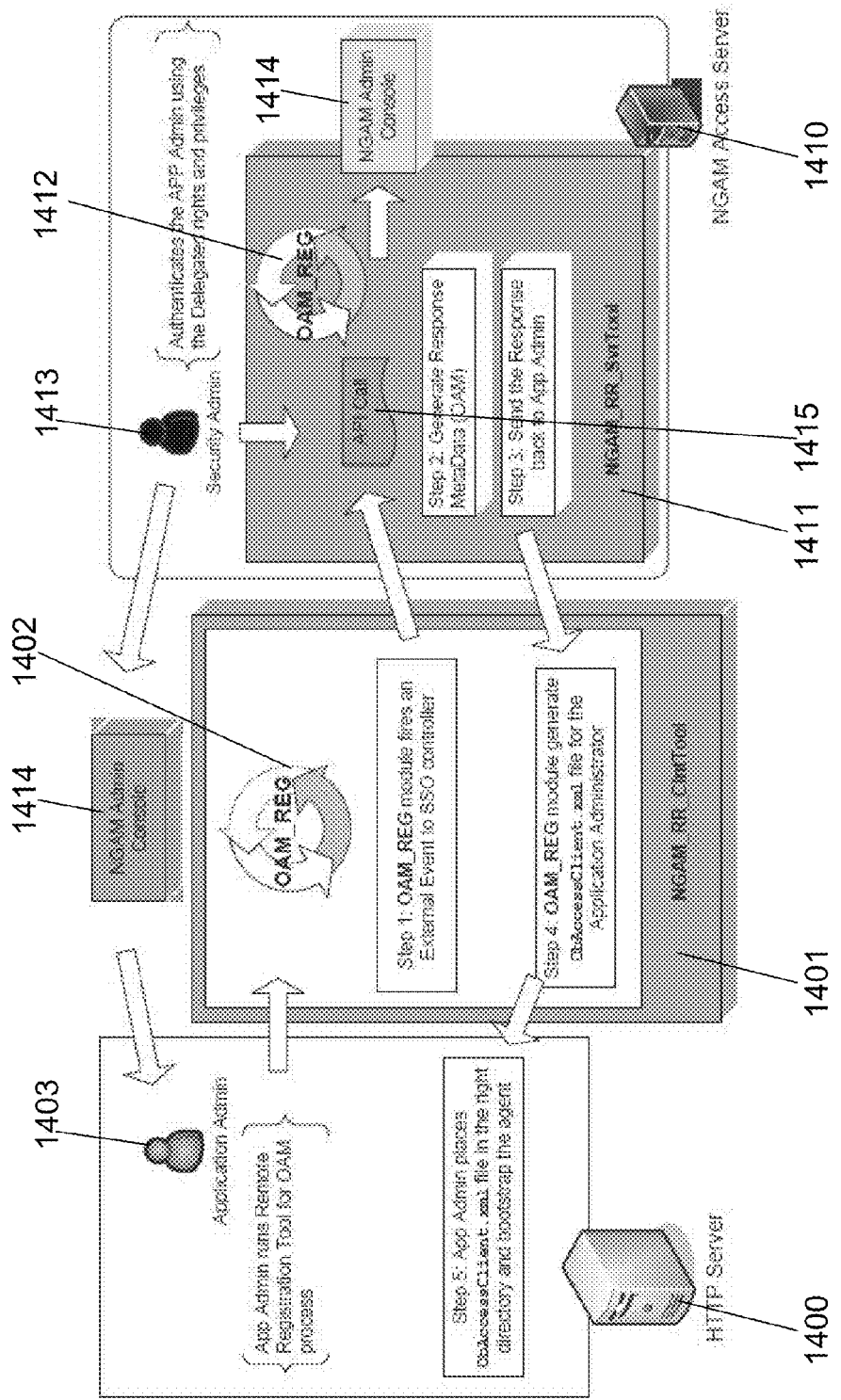
FIG. 14 illustrates an OAM partner registration process in an in-band mode according to an embodiment of the invention.

FIG. 14 illustrates an OAM partner registration process in an in-band mode according to an embodiment of the invention. The embodiment includes HTTP server 1400 and NGAM access server 1410. The illustrated embodiment in FIG. 14 details how an OAM functional module (identified in FIG. 14 as OAM_REG 1402 and OAM_REG 1412) of a remote partner registration tool (identified in FIG. 14 as NGAM_RR_ClntTool 1401 and NGAM_RR_SvrTool 1411) operates an OAM partner registration process in an in-band mode. As shown in FIG. 14, the OAM partner registration process is performed by modules OAM_REG 1402 and OAM_REG 1412. As also shown in FIG. 14, module NGAM_RR_ClntTool 1401 runs module OAM_REG 1402 for application admin 1403, and module NGAM_RR_SvrTool 1411 runs module OAM_REG 1412 for security admin 1413. As will be described below in more detail, modules OAM_REG 1402 and OAM_REG 1412 have different functions, but interact with each other during the OAM partner registration process.

According to the embodiment of the invention, at NGAM access server 1410, security admin 1413 delegates provisioning rights to application admin 1403 of HTTP server 1400 using NGAM admin console 1414. After security admin 1413 has delegated provisioning rights to application admin 1403, application admin 1403 can use NGAM admin console 1414 or module OAM_REG 1402, utilizing specific credentials and authorizations provided by security admin 1413. Application admin 1413 then runs a remote registration tool (i.e., modules NGAM_RR_ClntTool 1401 and NGAM_RR_Svr-Tool 1411) for an OAM partner registration process.

At step 1, module OAM_REG 1402 creates an external event and transmits the external event to a SSO controller (not shown), upon a request from application admin 1413. According to the embodiment of the invention, the external event can be created as an API call, "OAM_Partner_Registration_Event" or "OAM_REG_EVT" (identified in FIG. 14 as API call 1415). Module OAM_REG 1412 receives API call 1415, sent by module OAM_REG 1402 via the SSO controller (not shown), and automatically registers the partner application using NGAM admin console 1414. At step 2, module OAM_REG 1412 generates a response object, OAM_REG_Res.xml, based on API call 1415. According to the embodiment, the response object is in an XML file format expected by application admin 1413. At step 3, module OAM_REG 1412 transmits the response object back to application admin 1413.

At step 4, module OAM_REG 1402 generates an ObAccessClient.xml file based on the response object transmitted by module OAM_REG 1412. At step 5, application admin 1403 places the ObAccessClient.xml file in the appropriate directory and bootstraps an OAM agent (not shown) which resides at HTTP server 1400.

Thus, according to the embodiment of the invention, modules OAM_REG 1402 and OAM_REG 1412 support configuration operations between HTTP server 1400 and NGAM access server 1410 to exchange a request object and a response object, and to produce an ObAccessClient.xml file. In the embodiment, there can be frequently polling to exchange configuration parameters between HTTP server 1400 and NGAM access server 1410.

Command Line Version of Partner Registration Tool (OAM/In-Band)

To further understand the out-of-band OAM partner registration process, the next section describes the command line version of the partner registration tool and parameters. An example of the command line version of module NGAM_RR_ClntTOOL 1401, which initiates the OAM partner registration process in an in-band mode, is shown below:

```
Command line: NGAM_REG_TOOL
    ToolLocation [Clnt]
    PartnerType [OAM]
    SecureMode [In-Band]
    RgstrPr [OAM_REG_Para, OAM_REG_EVT]
    OAM_REG Para [Parameters need to be specified]
```

The detailed parameters of OAM_REG_Para are described above in relation to the OAM partner registration process in an out-of-band mode.

Next, an example of the command line version of module NGAM_RR_SvrTool 1411, which produces a OAM_REG_Res.xml file, is shown below:

```
Command line: NGAM_REG_TOOL
    ToolLocation [Srvr]
```

```
    PartnerType [OAM]
    SecureMode [In-Band]
    RgstrPr [OAM_REG_EVT, OAM_REG_Res.xml]
    OAM_REG Para [Parameters need to be specified]
```

The detailed parameters of OAM_REG_Para are described above in relation to the OAM partner registration process in an out-of-band mode.

Next, an example of the command line version of module NGAM_RR_ClntTool 1401, which produces an ObAccessClient.xml file, is shown below:

```
Command line: NGAM_REG_TOOL
    ToolLocation [Clnt]
    PartnerType [OAM]
    SecureMode [In-Band]
    RgstrPr_Final [OAM_REG_Res.xml, ObAccessClient.xml]
    OAM_REG Para [Parameters need not be specified]
```

As can be seen above, the detailed parameters of OSSO_REG_Para do not need to be specified.

SSO Controller

Figure 15:
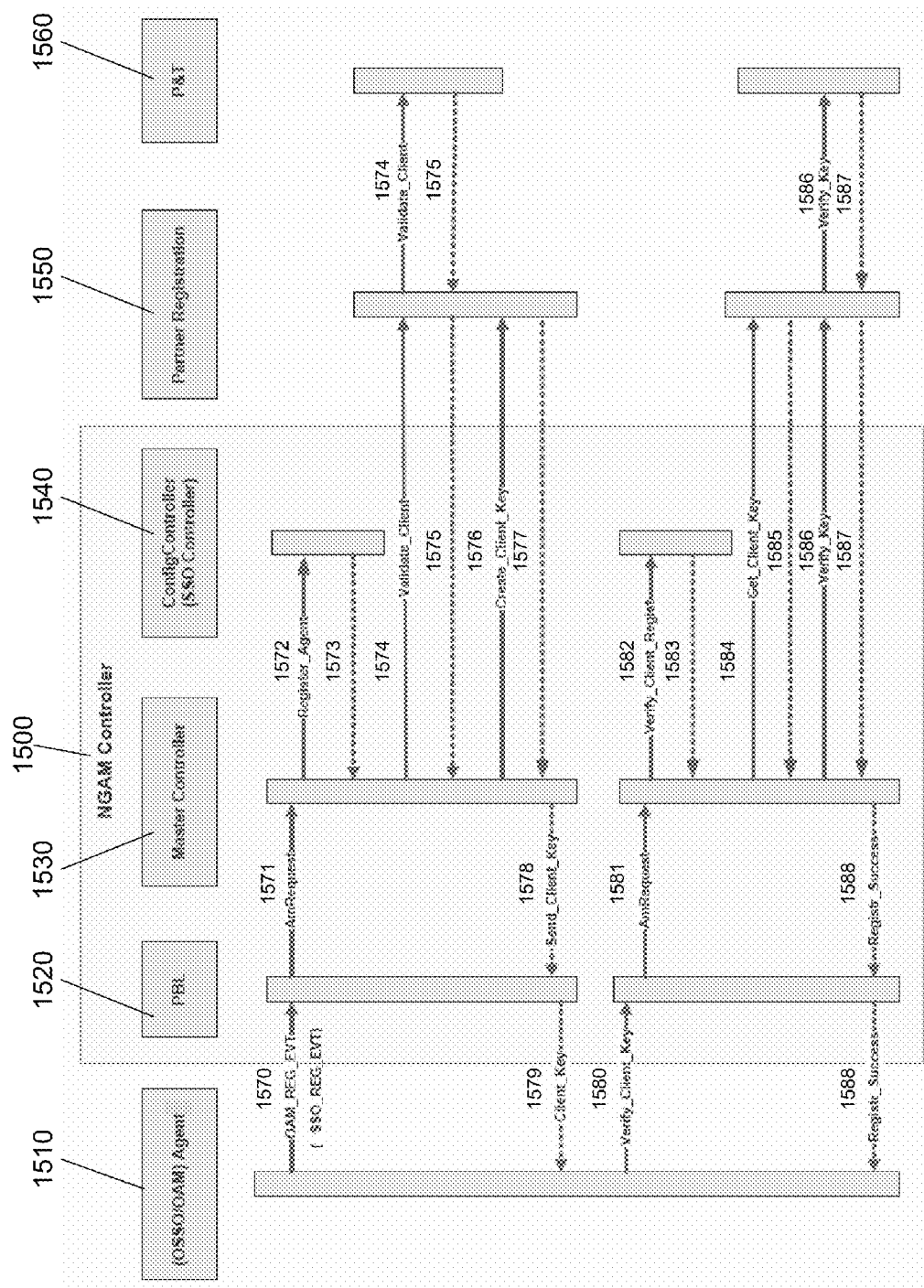
FIG. 15 illustrates a partner registration process involving an SSO controller, according to an embodiment of the invention.

FIG. 15 illustrates a partner registration process involving an SSO controller, according to an embodiment of the invention. As previously discussed, in a partner registration process involving an in-band mode, according to an embodiment, a remote registration tool can be configured to transmit an external event to an SSO controller through a protocol binding layer. The external event can trigger the registration of a partner application, and can result in the remote registration tool returning an appropriate response object. In an OSSO partner registration process, the response object can be an SSO_REG_Res.xml file. This file can subsequently be used to generate an osso.conf file. In an OAM partner registration process, the response object can be an OAM_REG_Res.xml file. This file can later be used to generate an ObAccessClient.xml file.

The illustrated embodiment includes NGAM controller 1500. NGAM controller 1500 is a binding block for NGAM and enables transparent communications between different NGAM components. NGAM controller 1500 creates a hub for adding pluggable components. NGAM controller 1500 is configured to receive events from (OSSO/OAM) agent 1510. In an embodiment, (OSSO/OAM) agent 1510 is an OSSO agent. In another embodiment, (OSSO/OAM) agent 1510 is an OAM agent.

According to the embodiment, an NGAM controller layer comprises the following components: a master controller, events, event handlers, flow controllers and individual engine controllers. Individual engine controllers can communicate with each other by events. A master controller can orchestrate NGAM event flows through flow controllers. Engine controllers can act as event handlers as well based flow controllers.

A master controller can act as a communication hub for all controllers. A protocol binding layer ('PBL") can call the master controller with an "AmRequest" object. The PBL is an interface for agents and proxies to communicate with an NGAM server. The PBL can convert protocol-specific messages to standard messages, and vice-versa. The PBL can include transport handlers and protocol handlers. A transport handler can handle a transport protocol, such as HTTP and Transmission Control Protocol/Internet Protocol ("TCP/IP"). A protocol handler can handle a message protocol, such as Security Assertion Markup Language ("SAML"), Network Access Protection ("NAP"), eXtensible Access Control Markup Language ("XACML"), and an OSSO protocol. The master controller can use the AmRequest object to create a corresponding event. Specifically, the PBL can add an "event hint" to the AmRequest object, and the master controller can utilize an event factory to create an event based on the event hint. The master controller can then pass the created event to registered event handlers (also identified as controllers).

A flow controller can define methods to control the event flow. If the PBL decides a base event for a certain request is the basis of a request, a controller which handles the first event can set the flow controller for the created event. For example, when receiving an authentication request, the PBL can set a base Event_Hint as SSO_AUTHENTICATE. The master controller than can create an "sso_authenticate" event for the base Event_Hint. The event handler chosen for the "sso_authenticate" event can become a SSO controller and acts as the flow controller, and is responsible for orchestrating the event flow, with respect to SSO authentication requests. Based on the previous events and status, the SSO controller can decide the next event to be process.

According to the embodiment, NGAM controller 1500 includes a PBL 1520, a master controller 1530, and a ConfigController, also known as a SSO controller 1540. The illustrated embodiment also includes a partner registration module (identified in FIG. 15 as partner registration module 1550) and a partner and trust module (identified in FIG. 15 as P&T module 1560). As previously described, in an in-band mode, a partner registration module can interact with an NGAM controller 1500 to handle external events in a partner registration process. This section details how a partner registration process can be achieved by interactions with NGAM controllers, according to an embodiment of the invention.

First, according to the embodiment, (OSSO/OAM) agent 1510 transmits an external event 1570 to PBL 1520 of NGAM controller 1500. In an embodiment where (OSSO/OAM) agent 1510 is an OSSO agent, (OSSO/OAM) Agent 1510 transmits an SSO_REG_EVT 1570. SSO_REG_EVT 1570 is used to ultimately create an osso.conf file to complete an OSSO partner registration process. In another embodiment where (OSSO/OAM) agent 1510 is an OAM agent, (OSSO/OAM) Agent 1510 transmits an OAM_REG_EVT 1570. OAM_REG_EVT 1570 is used to ultimately create a ObAccessClient.xml file to complete an OAM partner registration process.

Next, PBL 1520 changes external event 1570 into an AmRequest object 1571. PBL 1520 then transmits AmRequest object 1571 to master controller 1530 of NGAM controller 1500. Master controller 1530 then creates a standard NGAM event, Register_Agent 1572 based on AmRequest object 1571, and transmits the event to SSO controller 1540 of NGAM controller 1500. SSO controller 1540 manages the event flow and transmits response 1573 to master controller 1530.

Master controller 1530 then verifies (OSSO/OAM) agent 1510 with an event, Validate_Client 1574. Validate_Client 1574 is transmitted to partner registration module 1550, and subsequently transmitted to P&T module 1560. Response 1575 is then transmitted back to partner registration module 1550, which is subsequently transmitted back to master controller 1530. Master controller 1530 then requests that partner registration module 1550 generate a key by transmitting a standard event, Create_Client_Key 1576. Partner registration module 1550 subsequently generates a symmetric key for partner application and transmits response 1577 to master controller 1530. Master controller 1530 then transmits the symmetric key to PBL 1520 via Send_Client_Key 1578, and PBL 1520 transmits the symmetric key to (OSSO/OAM) Agent 1510 via Client_Key 1579.

According to the embodiment, the created key is then verified. Specifically, (OSSO/OAM) agent 1510 transmits Verify_Client_Key 1580 to PBL 1520. PBL 1520 then creates an object, Am Request 1581, and transmits Am Request 1581 to master controller 1530. Master controller 1530 then transmits Verify_Client_Regist 1582 to SSO controller 1540, and SSO controller 1540 transmits response 1583 to master controller 1530. Master controller 1530 then requests a client key by transmitting Get_Client_Key 1584 to partner registration module 1550, and in response, partner registration module 1550 transmits the client key via response 1585. Master controller 1530 then verifies the client key by transmitting Verify_Key 1586 to partner registration module 1550, and in turn, partner registration module 1550 transmits Verify_Key 1586 to P&T module 1560. P&T module 1560 then confirms that the client key is verified, and transmits response 1587 to partner registration module 1550, and in turn, partner registration module 1550 transmits response 1587 to master controller 1530. Master controller then notifies PBL 1520 of the successful verification by transmitting Registr_Success 1588 to PBL 1520, and in turn, PBL 1520 transmits Registr_Success 1588 to (OSSO/OAM) agent 1510.

Key Generation

Figure 16:
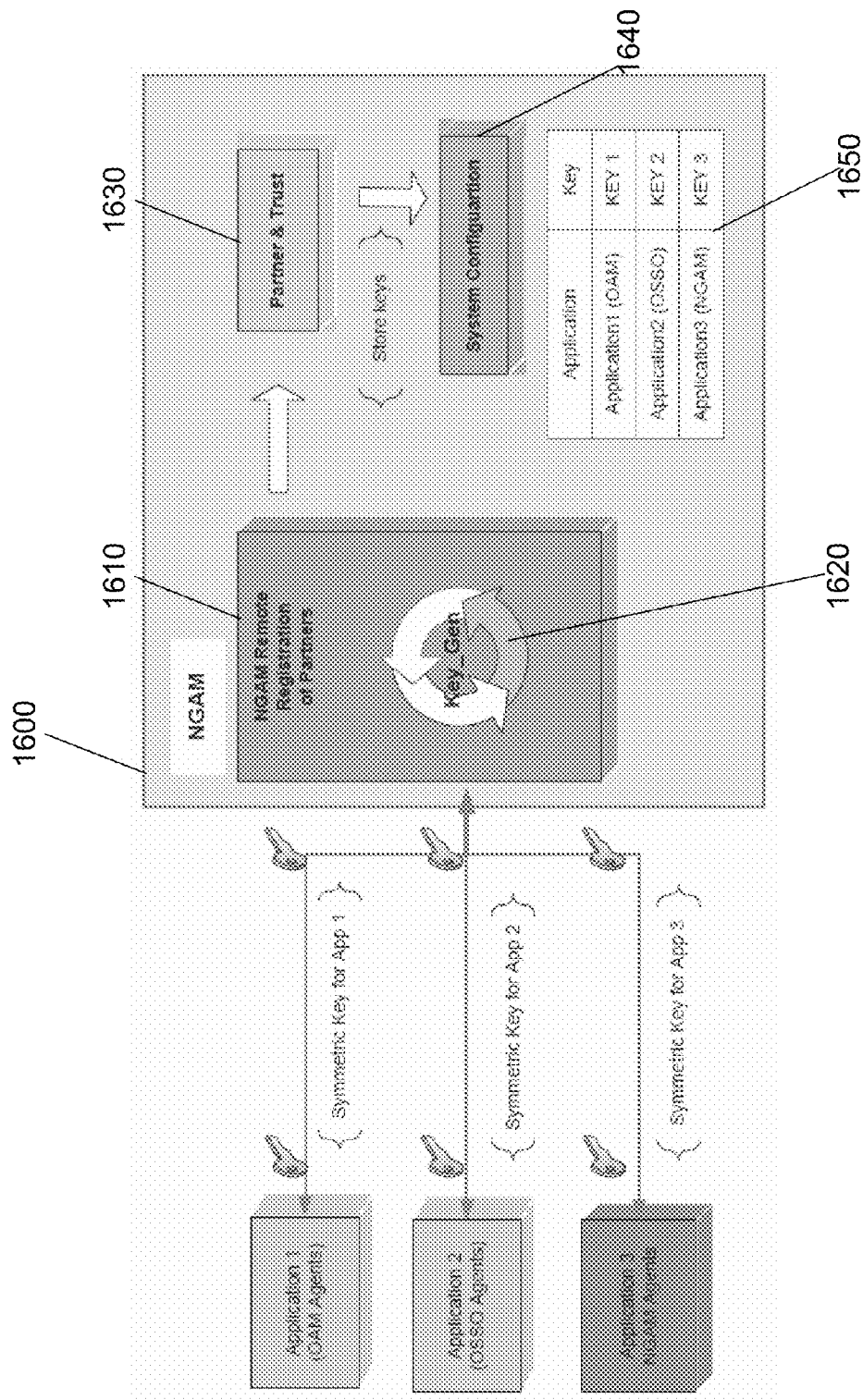
FIG. 16 illustrates a key generation process according to an embodiment of the invention.

FIG. 16 illustrates a key generation process according to an embodiment of the invention. As previously described, a partner registration process (such as a OSSO partner registration process, or an OAM partner registration process) generates a symmetric key for the partner. The illustrated embodiment includes three partner applications, Applications 1, 2, and 3, and NGAM Server 1600. Application 1 is an OAM agent. Application 2 is an OSSO agent. Application 3 is a NGAM agent. NGAM Server 1600 includes a remote registration tool (identified in FIG. 16 as NGAM remote registration of partners module 1610), and the remote registration tool includes a key generation function module (identified in FIG. 16 as module Key_Gen 1620). NGAM Server 1600 also includes a partner & trust module (identified in FIG. 16 as partner & trust module 1630), a system configuration 1640, and a storage 1650.

According to the embodiment, application 1, application 2, and application 3 each transmit a request to register the respective partner application. For each application, Key_Gen 1620 generates a symmetric key and replies to each application with the generated key. In the illustrated embodiment, module Key_Gen 1620 generates symmetric key KEY 1 for application 1 (i.e., an OAM agent) and transmits KEY 1 to application 1. Module Key_Gen 1620 also generates symmetric key KEY 2 for application 2 (i.e., an OSSO agent) and transmits KEY 2 to application 2. Module Key_Gen 1620 also generates symmetric key KEY 3 for application 3 (i.e., an NGAM agent) and transmits Key 3 to application 3.

In the embodiment, NGAM remote registration of partners module 1610 then transmits mapping information of the generated key, key, and the type of agent to partner & trust module 1630. In the illustrated embodiment, the mapping information indicates that KEY 1 is mapped to application 1, KEY 2 is mapped to application 2, and KEY 3 is mapped to application 3. Partner & trust module 1630 then persists the mapping in system configuration 1640. Specifically, partner & trust module 1630 persists the mapping in storage 1650. Partner & trust module 1630 also provides APIs for an SSO controller or authentication engine to retrieve the partner keys and agent configuration.

According to the embodiment, module Key_Gen 1620 generates a symmetric key randomly with a different encryption method, dependent on a type of agent. For example, to generate a symmetric key of an OSSO agent, module Key_Gen 1620 can use and Advanced Encryption Standard (AES), which includes a 128-bit block cipher supporting keys of 128, 192, and 256 bits.

Interfaces (APIs) with Partner and Trust

As previously discussed, module Partner & Trust 1630 of FIG. 16 provides APIs for an SSO controller or authentication engine to retrieve the partner keys and agent configuration. According to an embodiment of the invention, the APIs construct a logical object which represents a partner application (identified as an "PartnerInfo" object) and calls a partner manager logical object (identified as an "PartnerManager" object) to add the PartnerInfo object to a storage.

The following is an example API of a PartnerInfo object:

```
public class PartnerInfo {
    // Basic constructor - creates a "blank" partner
    public PartnerInfo( );
    // getter method for partner ID. This value is read-only since it is
the key in the partner metadata table.
    public String getPartnerID( );
    // get/set methods for the cryptographic key(s).
    // identifier can identify symmetric vs. asymmetric, signing vs.
encryption, etc. allowing for multiple keys per partner
    public Key getKey(String identifier);
    public void setKey(String identifier, Key k);
    // get/set methods for arbitrary properties
    // Can include Basic (attribute-value) and XML properties.
    // Basic properties might include location, trust model type, etc.
    // XML properties might include token format.
    public enum PropertyType {BASIC, XML};
    public PropertyType getPropertyType(String key);
    public String getBasicProperty(String key);
    public void setBasicProperty (String key, String value);
    public org.w3c.dom.Document getXMLProperty(String key);
    public void setXMLProperty(String key, org.w3c.dom.Document
value);
    // lists all keys.
    public Iterator<String> getProperties( );
}
```

The following is an example API of a PartnerInfo object:

```
public class PartnerManager {
    //this class should be a singleton; there is only one partner store
    private PartnerManager( );
    public static PartnerManager getPartnerManager( );
    //provide useful constants for hashtable key names
    public static final String ACCESS_POLICY = "access_policy";
    public static final String BASE_URL = "base_url";
    /* ...more constants for commonly needed SSO/STS/etc. use cases...
    */
    // provide constant names for trust models
    public static final String DIRECT_TRUST = "DIRECT";
    public static final String BROKERED_TRUST = "BROKERED";
    public static final String INDIRECT_BROKERED_TRUST =
"INDIRECT";
    // Basic get/set/list/delete functions for partners
    public PartnerInfo getPartnerInfo(String partnerID);
    public void setPartnerInfo(PartnerInfo newInfo);
    //note: newInfo already contains a partnerID
    public Iterator<String> listPartners( ); //get all partner IDs
    //Deletes the partner from the partner store. If the Boolean is true,
also calls the key storage to remove the key(s) associated with this partner.
    public void deletePartnerInfo(String partnerID, Boolean
deleteAssociatedKeys);
    //configuration info for the partner manager itself
    public String getKeyStoreLocation( );
    public void setKeyStoreLocation(String location);
    public void setKeyStorePassword(char[ ] password);
    // Partner storage
```

```
    public enum PartnerStoreType {XML_FILE, LDAP, DATABASE};
    public PartnerStoreType getPartnerStoreType( );
    public void setPartnerStoreType(PartnerStoreType storeType);
    //config info for the various store types. Only the active one as
defined above is actually used.
    public String getXMLFileLocation( );
    public void setXMLFileLocation(String fileLocation);
    public String getLDAPHost( );
    public void setLDAPHost(String hostname);
    public int getLDAPPort( );
    public void setLDAPPort (int portnum);
    public String getLDAPUser( );
    public void setLDAPUser(String username);
    //there is no getLDAPPassword method
    public void setLDAPPassword (String password);
    public String getDBHost( );
    public void setDBHost(String hostname);
    public int getDBPort( );
    public void setDBPort (int portnum);
    public String getDBUser( );
    public String setDBUser (String username);
    //there is no getDBPassword method
    public void setDBPassword (String password);
}
```

The PartnerInfo( ) and PartnerInfo(String x) methods create a PartnerInfo object with a random or specified ID. The PartnerInfo.setBasicProperty(String key, String value) method adds a regular property name/value pair. The PartnerInfo.setKey(String identifier, Key k) method adds a key with a specified name. The PartnerManager.setPartnerInfo(PartnerInfo newInfo) method adds the partner information to the Partner and Trust storage.

Security Model

Figure 17:
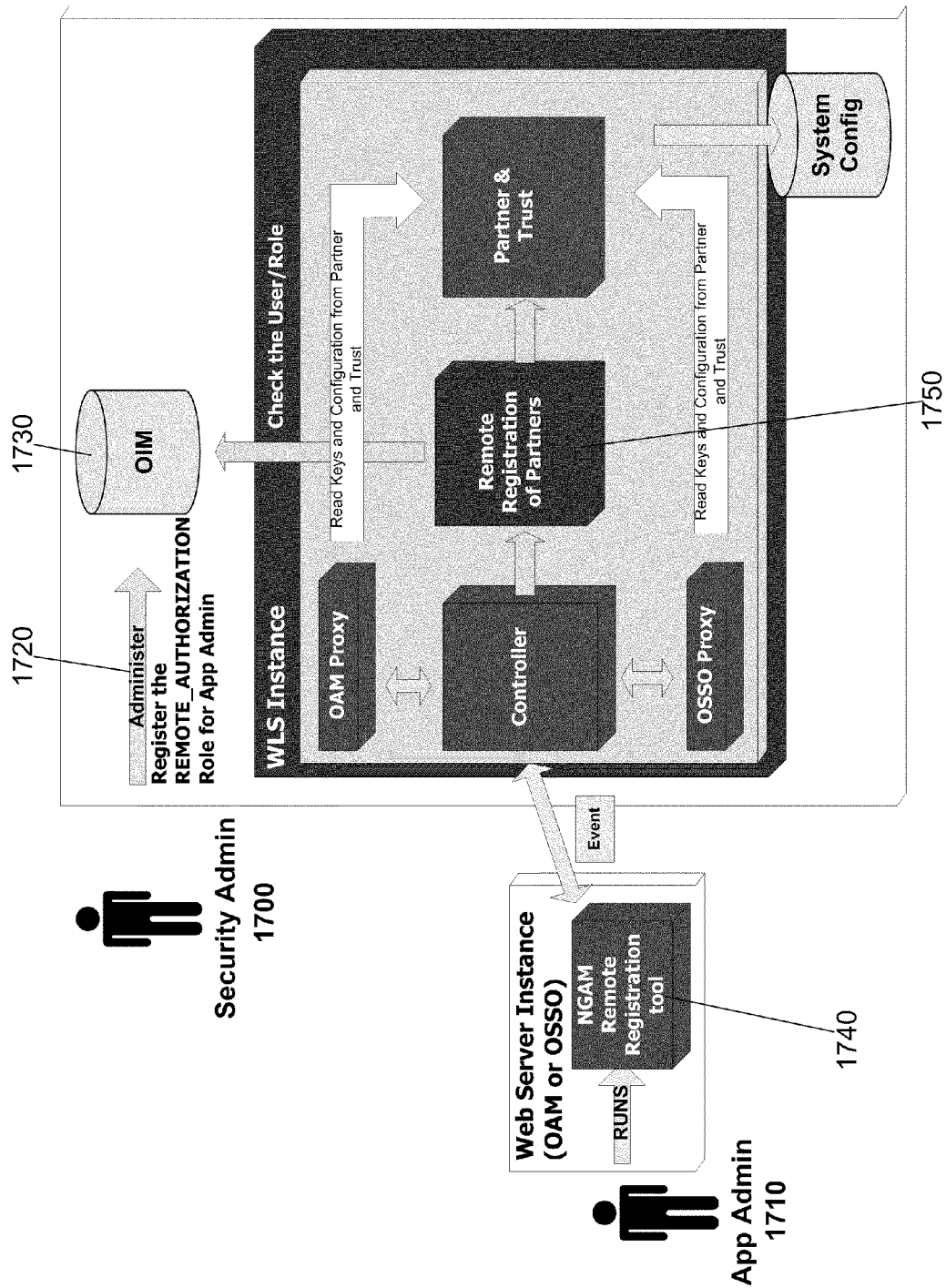
FIG. 17 illustrates a security model utilized in a partner registration process according to an embodiment of the invention.

FIG. 17 illustrates a security model utilized in a partner registration process according to an embodiment of the invention. According to the embodiment, security admin 1700 registers a role "REMOTE AUTHORIZATION" to app admin 1710 at 1720. Security admin 1700 uses Oracle Identity Manager (OIM) 1730 for validating the user role of app admin 1710. At runtime, NGAM remote registration tool module 1740 passes the runtime user/password of the partner application to remote registration of partners module 1750. Remote registration of partners module 1750 then validates the runtime user/password against OIM 1730 and once validated, runs the partner registration process described above.

OAM Transport Security Levels

Figure 18:
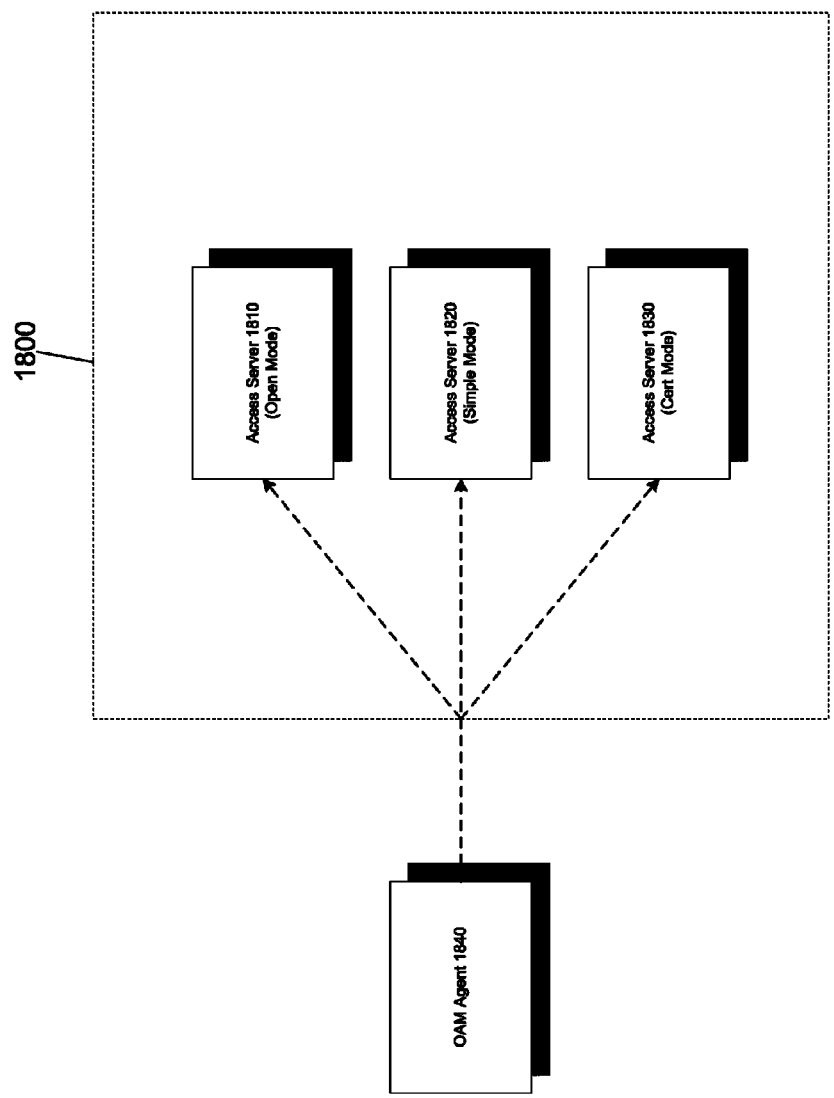
FIG. 18 illustrates an OAM partner registration process involving three OAM modes according to an embodiment of the invention.

FIG. 18 illustrates an OAM partner registration process involving three OAM transport security levels according to an embodiment of the invention. As previously described, according to the embodiment of the invention, an OAM partner registration process requires at least one access server to be installed. An access server instance in an access system console is first created. Next, a transport security level for installation is selected. The three transport security levels for installation are open, simple, and cert. In an open transport security level, an access gate and the access server communicate over an open protocol with no security. In a simple transport security level, a password is shared between an access gate and the access server for security, where an access gate must provide a password in order to communicate with the access server. A certificate is then generated from the password. In a cert transport security level, an access gate provides a pre-generated certificate from a third-party to the access server in order to communicate with the access server. Once a transport security level is selected, the access server is installed and configured with configuration parameters According to the embodiment, system 1800 includes multiple access server instances: access server 1810 which is an access server instance which uses an open transport security level, access server 1820 which is an access server instance which uses a simple transport security level, and access server 1830 instance which is an access server which uses a cert transport security level. When OAM agent 1840 attempts to register with an access server, system 1800 will connect OAM agent 1840 to an access server which uses a same transport security level as a requested transport security level of OAM agent. For example, if OAM agent 1840 requests to register using an open transport security level, then system 1800 will connect OAM agent 1840 with access server 1810. However, if OAM agent 1840 requests to register using a simple transport security level, then system 1800 will connect OAM agent 1840 with access server 1820. Likewise, if OAM agent 1840 requests to register using a cert transport security level, then system 1800 will connect OAM agent 1840 with access server 1830. In an alternate embodiment, if there is not an available access server instance using a transport security level requested by OAM agent, then system 1800 transmits an error message to OAM agent 1840.

Partner Registration Flow Diagrams

Figure 19:
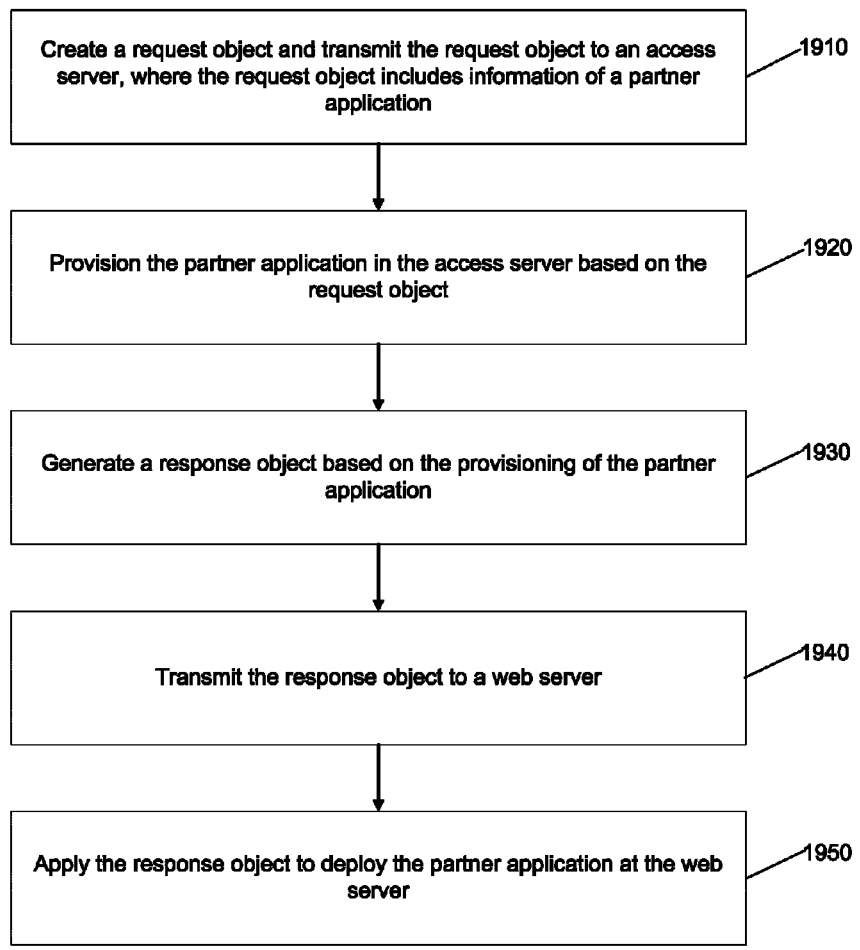
FIG. 19 illustrates a flow diagram of the functionality of a partner registration module according to an embodiment of the invention.
Figure 20:
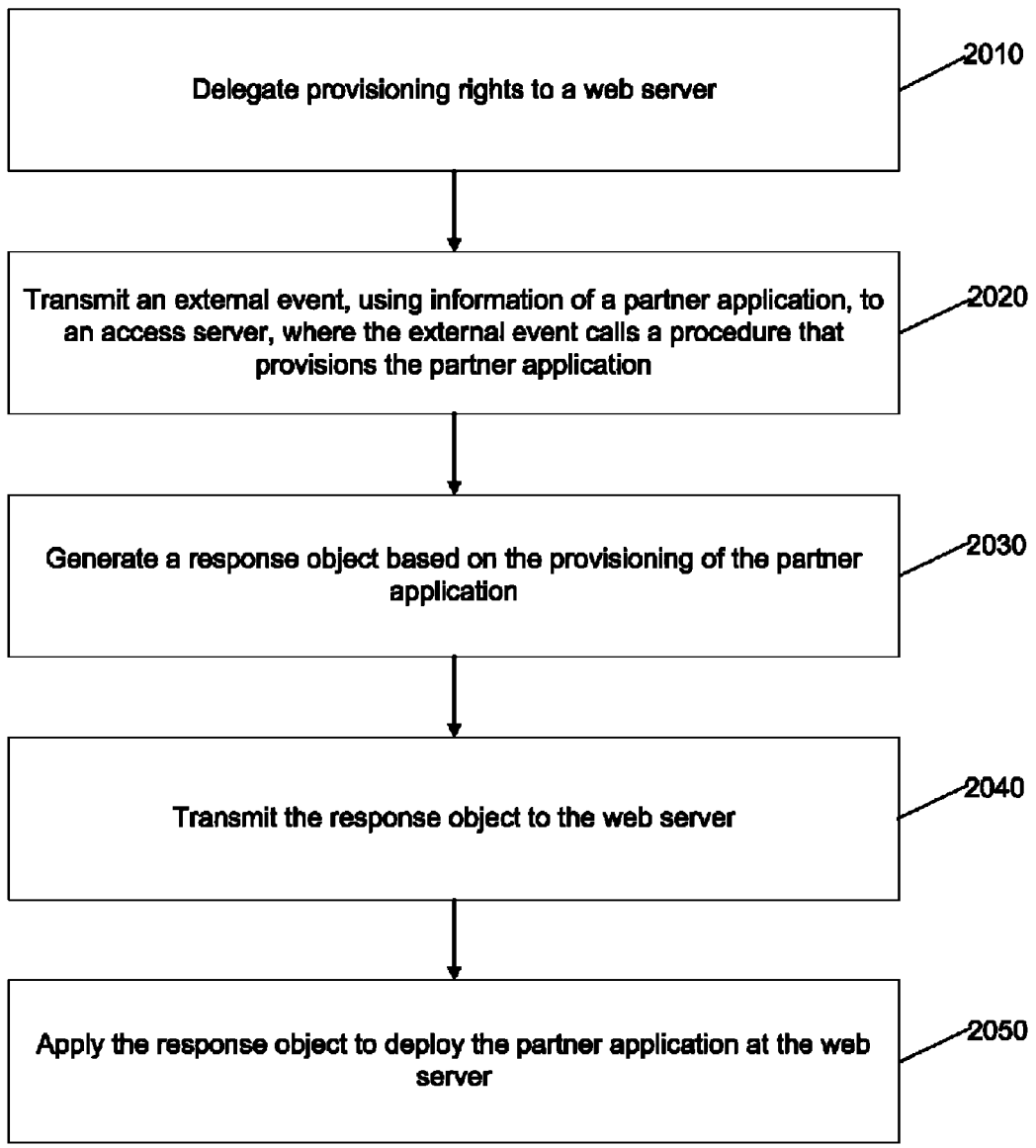
FIG. 20 illustrates another flow diagram of the functionality of a partner registration module according to an embodiment of the invention.

FIG. 19 illustrates a flow diagram of the functionality of a partner registration module according to an embodiment of the invention. In one embodiment, the functionality of the flow diagram of FIG. 19, as well as FIG. 20, is implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1910, the partner registration module creates a request object and transmits the request object to an access server, where the request object includes information of a partner application. At 1920, the partner registration module provisions the partner application in the access server based on the request object. At 1930, the partner registration module generates a response object based on the provisioning of the partner application. At 1940, the partner registration module transmits the response object to a web server. At 1950, the partner registration module applies the response object to deploy the partner application at the web server.

FIG. 20 illustrates another flow diagram of the functionality of a partner registration module according to an embodiment of the invention. At 2010, the partner registration module delegates provisioning rights to a web server. At 2020, the partner registration module transmits an external event, using information of a partner application, to an access server, where the external event calls a procedure that provisions the partner application. At 2030, the partner registration module generates a response object based on the provisioning of the partner application. At 2040, the partner registration module transmits the response object to the web server. At 2050, the partner registration module applies the response object to deploy the partner application at the web server.

Thus, according to an embodiment of the invention, a partner registration module can support partner registration operations under two secure modes, out-of-band, and in-band. The partner registration operations can be performed through the partner registration module. Therefore, according to the embodiment, partner registrations can be automated and provide secure access to key systems while still retaining accessibility. Furthermore, the partner registration module can integrate diverse partner registration processes, such as an OSSO partner registration process, and an OAM partner registration process.

The features, structures, or characteristics of the invention described throughout this specification may be combined in any suitable manner in one or more embodiments. For example, the usage of "an embodiment," "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "an embodiment," "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to register a partner application, the registering comprising:

creating a request object and transmitting the request object and a partner type parameter that identifies a partner type of the partner application to an access server, wherein the request object comprises metadata utilized by a partner registration process, and wherein the metadata comprises information of the partner application;

provisioning the partner application in the access server based on the request object, wherein provisioning the partner application further comprises registering the partner application using the partner registration process, wherein the partner registration process is selected from a plurality of partner registration processes based on the partner type parameter;

generating a response object based on the provisioning of the partner application, wherein the response object comprises metadata generated by the selected partner registration process, and wherein the response object is in a format that corresponds to the selected partner registration process;

transmitting the response object to a web server;

creating an artifact using the response object at the web server, wherein the artifact is in a format that is based on the format of the response object;

placing the artifact in a directory of the web server; and initiating the partner application using the artifact.

2. The non-transitory computer-readable medium of claim 1, wherein the partner application is a single sign-on agent, and wherein provisioning the partner application further comprises registering the partner application using a single sign on partner registration process.

3. The non-transitory computer-readable medium of claim 1, wherein the partner application is an access manager agent, and wherein provisioning the partner application further comprises registering the partner application using an access manager partner registration process.

4. The non-transitory computer-readable medium of claim 3, the registering further comprising:

determining a requested transport security level; and transmitting the request object to the access server that utilizes a transport security level that is the same as the requested transport security level, wherein the transport security level is one of an open transport security level, a simple transport security level, or a cert transport security level.

5. The non-transitory computer-readable medium of claim 1, wherein the request object comprises a file in an Extensible Markup Language format, and wherein the file comprises a superset of elements based on a partner registration process.

6. The non-transitory computer-readable medium of claim 5, wherein the partner registration process comprises a single sign-on partner registration process.

7. The non-transitory computer-readable medium of claim 5, wherein the partner registration process comprises an access manager partner registration process.

8. The non-transitory computer-readable medium of claim 1, wherein the response object comprises a file in an Extensible Markup Language format, and wherein the file comprises a superset of elements based on a Partner registration process.

9. The non-transitory computer-readable medium of claim 8, wherein the partner registration process comprises a single sign-on partner registration process.

10. The non-transitory computer-readable medium of claim 8, wherein the partner registration process comprises an access manager partner registration process.

11. The non-transitory computer-readable medium of claim 1, the registering further comprising:

generating a symmetric key for the partner application; and persisting the symmetric key in a storage along with mapping information of the symmetric key, and an agent type of the partner application.

12. A computer-implemented method for registering a partner application, comprising:

creating a request object and transmitting the request object and a partner type parameter that identifies a partner type of the partner application to an access server, wherein the request object comprises metadata utilized by a partner registration process, and wherein the metadata comprises information of the partner application;

provisioning, by an electronic processor, the partner application in the access server based on the request object, wherein provisioning the partner application further comprises registering the partner application using the partner registration process, wherein the partner registration process is selected from a plurality of partner registration processes based on the partner type parameter;

generating a response object based on the provisioning of the partner application, wherein the response object comprises metadata generated by the selected partner registration process, and wherein the response object is in a format that corresponds to the selected partner registration process;

transmitting the response object to a web server;

creating using the response object at the web server, wherein the artifact is in a format that is based on the format of the response object;

placing the artifact in a directory of the web server; and initiating the partner application using the artifact.

13. The computer-implemented method of claim 12, wherein the partner application is a single sign-on agent, and wherein provisioning the partner application further comprises registering the partner application using a single sign-on partner registration process.

14. The computer-implemented method of claim 13, wherein the partner application is an access manager agent, and wherein provisioning the partner application further comprises registering the partner application using an access manager partner registration process.

15. The computer-implemented method of claim 13, the instructions further comprising:

generating a symmetric key for the partner application; and persisting the symmetric key in a storage along with mapping information of the symmetric key, and an agent type of the partner application.

16. The computer-implemented method of claim 12, the instructions further comprising:

determining a requested transport security level; and transmitting the request object to the access server that utilizes a transport security level that is the same as the requested transport security level, wherein the transport security level is one of an open transport security level, a simple transport security level, or a cert transport security level.

17. A partner registration system comprising:

a web server comprising;

a client-side partner registration module comprising instructions;

a memory configured to store the instructions of the client-side partner registration module;

an electronic processor configured to execute the instructions of the client-side partner registration module stored on the memory; and an access server comprising;

a server-side partner registration module comprising instructions;

a memory configured to store the instructions of the server-side partner registration module;

an electronic processor configured to execute the instructions of the server-side partner registration module stored on the memory;

wherein the web server is configured, when executing the instructions of the client-side partner registration module stored on the memory, to create a request object and transmit the request object and a partner type parameter that identifies a partner type of the partner application to the access server, wherein the request object comprises metadata utilized by a partner registration process, and wherein the metadata comprises information of a partner application;

wherein the access server is configured, when executing the instructions of the server-side partner registration module stored on the memory, to provision the partner application in the access server based on the request object, wherein provisioning the partner application further comprises registering the partner application using the partner registration process, wherein the partner registration process is selected from a plurality of partner registration processes based on the partner type parameter;

wherein the access server is further configured, when executing the instructions of the server-side partner registration module stored on the memory, to generate a response object based on the provisioning of the partner application, wherein the response object comprises metadata generated by the selected partner registration process, and wherein the response object is in a format that corresponds to the selected partner registration process;

wherein the access server is further configured to transmit the response object to the web server; and wherein the web server is further configured to create an artifact using the response object, place the artifact in a directory of the web server, and initiate the partner application using the artifact, wherein the artifact is in a format that is based on the format of the response object.

18. The partner registration system of claim 17, wherein the partner application is a single sign-on agent; and wherein provisioning the partner application further comprises registering the partner application using a single sign-on partner registration process.

19. The partner registration system of claim 17, wherein the partner application is an access manager agent and wherein provisioning the partner application further comprises registering the partner application using an access manager partner registration process.

20. The partner registration system of claim 17, wherein the access server is further configured to generate a symmetric key for the partner application; and wherein the access server is further configured to persist the symmetric key in a storage along with mapping information of the symmetric key, and an agent type of the partner application.

21. The partner registration system of claim 17, wherein the web server is further configured to determine a requested transport security level;

wherein the web server is further configured to transmit the request object to the access server that utilizes a transport security level that is the same as the requested transport security level; and wherein the transport security level is one of an open transport security level, a simple transport security level, or a cert transport security level.

* * * * *